US010984964B2

(12) United States Patent
Fan et al.

(10) Patent No.: US 10,984,964 B2
(45) Date of Patent: Apr. 20, 2021

(54) FLEXIBLE SUPERCAPACITORS AND DEVICES CONTAINING THE SAME

(71) Applicant: BOARD OF REGENTS, THE UNIVERSITY OF TEXAS SYSTEM, Austin, TX (US)

(72) Inventors: Donglei Fan, Austin, TX (US); Weigu Li, Austin, TX (US); Jianhe Guo, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 3 days.

(21) Appl. No.: 16/330,972

(22) PCT Filed: Sep. 7, 2017

(86) PCT No.: PCT/US2017/050436
§ 371 (c)(1),
(2) Date: Mar. 6, 2019

(87) PCT Pub. No.: WO2018/049004
PCT Pub. Date: Mar. 15, 2018

(65) Prior Publication Data
US 2019/0237269 A1    Aug. 1, 2019

Related U.S. Application Data

(60) Provisional application No. 62/384,378, filed on Sep. 7, 2016.

(51) Int. Cl.
*H01G 11/36*    (2013.01)
*H01G 11/46*    (2013.01)
(Continued)

(52) U.S. Cl.
CPC .......... *H01G 11/36* (2013.01); *C01B 32/184* (2017.08); *C01B 32/205* (2017.08); *H01G 11/08* (2013.01);
(Continued)

(58) Field of Classification Search
CPC ........ H01G 11/32; H01G 11/24; H01G 11/28; H01G 11/36; H01G 11/66; H01G 11/04;
(Continued)

(56) References Cited

U.S. PATENT DOCUMENTS

2009/0011204 A1    1/2009  Wang et al.
2011/0206992 A1*   8/2011  Campbell ............. H01M 4/803
                                              429/235
(Continued)

FOREIGN PATENT DOCUMENTS

WO    2014/200428    12/2014
WO    2016/066843    5/2016

OTHER PUBLICATIONS

International Search Report and Written Opinion dated Nov. 13, 2017, from International Application No. PCT/US2017/050436, 11 pages.
(Continued)

*Primary Examiner* — Michael P McFadden
(74) *Attorney, Agent, or Firm* — Meunier Carlin & Curfman LLC

(57) ABSTRACT

Disclosed herein are stretchable strain sensors that include a graphite network embedded within an elastomeric material. The sensors are wearable and can be used to detect mechanical movements in three dimensions in a wide variety of contexts.

19 Claims, 27 Drawing Sheets

(51) Int. Cl.
| | |
|---|---|
| H01G 11/08 | (2013.01) |
| H01G 11/28 | (2013.01) |
| H01G 11/26 | (2013.01) |
| C01B 32/205 | (2017.01) |
| H01G 11/82 | (2013.01) |
| H01G 11/70 | (2013.01) |
| C01B 32/184 | (2017.01) |
| H01G 11/86 | (2013.01) |

(52) U.S. Cl.
CPC ............ *H01G 11/26* (2013.01); *H01G 11/28* (2013.01); *H01G 11/46* (2013.01); *H01G 11/70* (2013.01); *H01G 11/82* (2013.01); *H01G 11/86* (2013.01)

(58) Field of Classification Search
CPC ........ H01G 11/58; H01G 11/08; H01G 11/26; H01G 11/46; H01G 11/70; H01G 11/82; H01G 11/86; Y02E 60/13; C01B 32/205; C01B 32/184
See application file for complete search history.

(56) References Cited

U.S. PATENT DOCUMENTS

| | | | |
|---|---|---|---|
| 2014/0322608 A1 | 10/2014 | Claussen et al. | |
| 2015/0259212 A1 | 9/2015 | Li et al. | |
| 2015/0360952 A1 | 12/2015 | Fan et al. | |
| 2016/0043384 A1* | 2/2016 | Zhamu ................. | H01M 4/366 429/231.4 |
| 2016/0049658 A1* | 2/2016 | Chae ................. | H01M 10/0569 429/104 |
| 2017/0008769 A1* | 1/2017 | Otter ..................... | H01M 4/587 |

OTHER PUBLICATIONS

An, G. et al. "Low-temperature synthesis of Mn3O4 nanoparticles loaded on multi-walled carbon nanotubes and their application in electrochemical capacitors", Nanotechnology 2008, 19, 275709.

Dubal, D.P. et al. "A novel chemical synthesis and characterization of Mn3O4 thin films for supercapacitor application", Appl. Surf. Sci. 2010, 256, 4411.

Lee, J.W. et al. "A Facile and Template-Free Hydrothermal Synthesis of Mn3O4 Nanorods on Graphene Sheets for Supercapacitor Electrodes with Long Cycle Stability", Chem. Mater. 2012, 24, 1158.

Wang, D. et al. "Facile Synthesis of Porous Mn3O4 Nanocrystal-Graphene Nanocomposites for Electrochemical Supercapacitors", Eur. J. Inorg. Chem. 2012, 2012, 628.

Li, L. et al. "Hydrothermal Self-assembly Synthesis of Mn3O4/Reduced Graphene Oxide Hydrogel and Its High Electrochemical Performance for Supercapacitors", J. Chem. 2013, 31, 1290.

Kim, K.S. et al. "Electrochemical Performance of Activated Carbons/Mn3)4-Carbon Blacks for Supercapacitor Electrodes", Bull. Korean Chem. Soc. 2013, 34, 2343.

Wu, Y. et al. "A novel solvothermal synthesis of Mn3O4/graphene composites for supercapacitors", Electrochim. Acta 2013, 90, 210.

Dong, R. et al. "Enhanced Supercapacitor Performance of Mn3O4 Nanocrystals by Doping Transition-Metal Ions", ACS Appl. Mater. Interfaces 2013, 5, 9508.

Nagamuthu, S. et al. "Synthesis of Mn3O4/Amorphous Carbon Nanoparticles as Electrode Material for High Performance Supercapacitor Applications", Energy Fuels 2013, 27, 3508.

Jang, K. et al. "Facile Low-temperature Chemical Synthesis and Characterization of a Manganese Oxide/multi-walled Carbon Nanotube Composite for Supercapacitor Applications", Bull. Korean Chem. Soc. 2014, 35, 2974.

Jin, G. et al. "Strongly coupled graphene/Mn3O4 composite with enhanced electrochemical performance for supercapacitor electrode", Electrochim. Acta 2015, 178, 689.

Mondal, C. et al. "Mn3O4 nanoparticles anchored to multiwall carbon nanotubes: a distinctive synergism for high-performance supercapacitors", New J. Chem. 2015, 39, 8373.

Qiao, Y. et al. "A modified solvothermal synthesis of porous Mn3O4 for supercapacitor with excellent rate capability and long life cycle", J. Alloys Compd. 2016, 660, 416.

Yang, X. et al. "Mn3O4 nanocyrstalline/graphene hybrid electrode with high capacitance", Electrochim. Acta 2016, 188, 398.

Liao, Q.Y. et al. "Vertically-aligned graphene@Mn3O4 nanosheets for a high-performance flexible all-solid-state symmetric supercapacitor", J. Mater. Chem. A 2016, 4, 8830.

\* cited by examiner

US 10,984,964 B2

FLEXIBLE SUPERCAPACITORS AND DEVICES CONTAINING THE SAME

CROSS REFERENCE TO RELATED APPLICATIONS

This application claims the benefit of U.S. Provisional Patent Application Ser. No. 62/384,378 filed Sep. 7, 2016, the disclosure of which is expressly incorporated herein by reference.

STATEMENT OF GOVERNMENT SUPPORT

This invention was made with government support under Grant no. CMMI1150767 and Grant no. CMMI1563382 awarded by the National Science Foundation. The government has certain rights in the invention.

FIELD OF THE INVENTION

The present invention relates to flexible supercapacitors and devices employing the same. The supercapacitors are characterized by a multilevel porous graphite structure combined with a pseudocapacitive material.

BACKGROUND

Flexible electronics have drawn immense research attention due to their grand potentials in revolutionizing the society and people's lives, from military defense, medical diagnosis and treatment, wellness preventive care, recreation and sports, to education. With the vigorous process of nanofabrication and nanotechnology, an array of flexible electronics has been demonstrated by extensive research efforts, including biochemical sensors, strain sensors, and optical devices. However, for many demonstrated applications, these devices still rely on the use of conventional power supplies, which is adversely rigid and bulky, greatly hampering the practical applications. Therefore, a variety of flexible energy conversion and storage systems ranging from photovoltaics, nanogenerators, lithium ion batteries, to supercapacitors, have emerged to enable all flexible/wearable and self-powered devices. Among them, flexible supercapacitors receive intensive interests owing to the high power density, ultra-long cycle life, as well as facileness and low cost in fabrication.

Carbonaceous nanomaterials, such as carbon nanotubes (CNTs), graphene, activated carbon, have been investigated extensively as electrode materials for supercapacitors, owing to their high electrical conductivity, chemical stability, mechanical durability, and large surface areas. Though such supercapacitors can go through over thousands of charge-discharge cycles with negligible loss of capacitance, the low specific capacitance compared to other energy devices limits the applications. On the other hand, pseudocapacitive materials, such as $Co_3O_4$, $MnO_2$, $Mn_3O_4$, NiO, $Ni(OH)_2$, and $RuO_2$, could provide ultrahigh capacitance because they exploit rapid and reversible redox reactions of the materials to store and release energy. Among them, $Mn_3O_4$ received enormous interests due to its earth abundance and high theoretical specific capacitance (~1400 F $g^{-1}$, at the potential window of 1.0 V). However, like many other pseudocapacitive materials, $Mn_3O_4$ is poor in electrical conductivity ($10^{-5}$-$10^{-6}$ S $cm^{-1}$), which greatly restricts the efficiency of charge transfer and thus the overall energy storage density of such supercapacitors.

Substantial efforts have been carried out to improve electric conductivity of pseudocapacitive materials by incorporating high-electric-conductive carbonaceous materials, such as graphene, multi-walled CNTs, amorphous carbon, and reduced graphene oxide (RGO). Most such materials are made in the form of powders and "glued" with active materials as electrodes by binders. For example, Lee et al. employed carbon black (10 wt %) and poly(vinylidene fluoride) (5 wt %), and Wang et al. used acetylene black (15 wt %), and poly(tetrafluoroethylene) (5 wt %) as binders in their $Mn_3O_4$/graphene electrodes respectively. While, binders are known to impair the overall performance of supercapacitors, as they not only decrease the electric conductivity and hamper the charge transport, but also increase the overall weight of electrodes. Efforts have been focused on removing the necessity of binders and conductive additives. Inert metallic foams, such as those made of Ni, or stainless steel are employed as binder-free supporting substrates. For instance, Zhu et al. reported $MnO_2$/CNT/graphene/Ni hybrid foams for binder-free supercapacitor electrodes (251 F $g^{-1}$ at current density of 1 A $g^{-1}$) with a loading density of 16 wt %, the specific capacitance of the electrodes was calculated by taking account of the pure mass of CNTs, $MnO_2$, and graphene. Wang et al. reported $Ni(OH)_2$ coated nickel foams with an ultrahigh capacitance (2161 F eat a current density of 3 A $g^{-1}$). However, if considering the mass of the employed supporting materials, the overall capacitance is significantly lowered, given the density of commercial Ni foams is ~40 mg $cm^{-2}$, over 40 times greater than that of the typical active materials of ~0.1-1 mg $cm^{-2}$. Moreover, the rigidity of metal current collectors also hampers the application in flexible electronics. Thus, flexible carbon fiber cloths were used as alternative electrode supports. Vertically aligned CNTs (VACNTs)/$MnO_2$ and graphene sheets (VAGN)/$Mn_3O_4$ grown on carbon cloth provide full cell capacitances of 51 F $g^{-1}$ and 140.5 F $g^{-1}$, respectively. Nevertheless, those capacitance values are calculated based on the net mass of active materials without considering the heavy mass of carbon fabric (780 mg $cm^{-3}$) and additives, which cannot truly reflect the overall capacitance of the electrode.

There have been studies on free-standing carbonaceous materials that can work as binder free electrodes in place of Ni foams and carbon cloths for flexible supercapacitors, e.g. RGO films and nanohybrid papers, CNT hybrid films, and graphene foams. Among them, ultrathin single-level porous graphite (or graphene) foams (SPGs) grown from commercial Ni foams receive great interests due to its light weight (0.7 to 1.5 mg $cm^{-2}$), flexibility, and capability of incorporating different kinds of pseudocapacitive materials. For instance, SPG/$MnO_2$ and SPG/polypyrrole (PPy) @$MnO_2$ composites can offer full cell capacitances of 30 F/g and 200 F/g based on the net mass of $MnO_2$, respectively. The specific areal mass density of SPGs, however, is much higher than that of loaded active material (0.2 to 0.4 mg $cm^{-2}$). Furthermore, the specific surface areas of SPGs are also limited by the large pore sizes of ~100 μm inherited from the templates, i.e., the Ni foams. Therefore, it is in a dire need to develop ultralight flexible electrode support that can offer truly large specific capacitance, based on the mass of the entire electrode when employed with active materials, and are highly durable under mechanical strains when integrated with flexible electronics.

Stretch-sensitive strain sensors are rapidly increasing in prevalence in a variety of technology areas. Sensors can provide real-time monitoring feedback in a variety of contexts, including medical, athletic and other kinesiological applications.

Previous work has reported a fabrication strategy for creating graphene based stretch-sensitive strain sensors that can be elongated up to 100% before showing mechanical fracture via integrating elastomer or rubber with conductive interconnected graphene networks, graphene woven fabrics, graphene ribbons and crumpled graphene. In addition, there are efforts focusing on pressure sensitive strain sensors, such as graphene-polyurethane sponges and microstructured graphene arrays. Nevertheless, none of the graphene based strain sensors demonstrates ultrasensitivity in plane strain detection as well as vertical pressure-detection with designed structures. Relatively few of these graphene based strain sensors have demonstrated strain detection in real time.

There remains a need for flexible supercapacitors with high capacity. There remains a need for flexible energy storage devices and stretch-sensitive strain sensors. There remains a need for improved stretch-sensitive strain sensors that can detect small change of strains in real time. There remains a need for sensors with improved durability and resilience over repeated use.

SUMMARY

Disclosed herein are flexible supercapacitor materials, which feature multilevel graphite foams having controllable porosity levels and/or increased surface areas. The multilevel graphite foams are combined with pseudocapacitive metals, e.g., transition metal oxides and/or hydroxides. The supercapacitors can be advantageously employed in flexible energy storage devices, include a variety of sensors. The sensors feature a graphite network embedded in an elastomeric material. In contrast to sensors in the prior art, the inventive separators do not require the use of additional polymeric material for structural strength. The sensors are useful in a variety of different applications The details of one or more embodiments are set forth in the descriptions below. Other features, objects, and advantages will be apparent from the description and from the claims.

DETAILED DESCRIPTION

Figure 1:
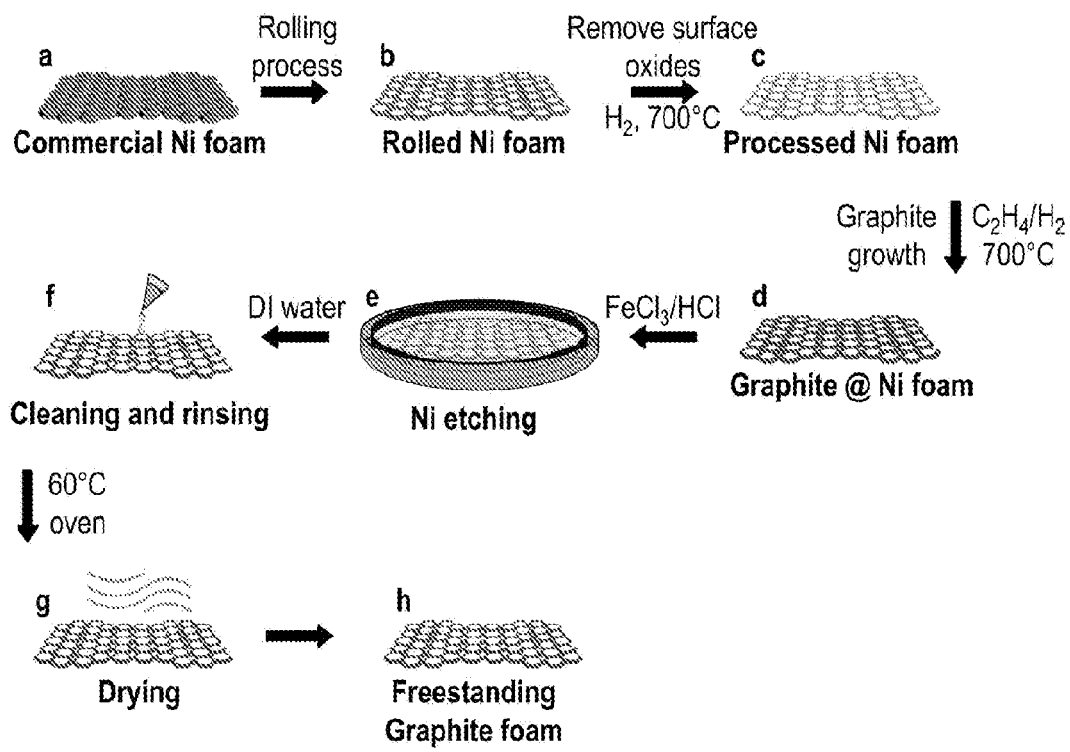
FIG. 1 includes a depiction of a fabrication process for obtaining the graphite network.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

As used herein, "psuedocapacitor" describes a material that can store electrical energy by electron transfer achieved via electrosorption, redox reactions, and intercalation processes.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Disclosed herein are flexible supercapacitors including porous graphite foams combined with one or more pseudocapacitive materials. The porous graphite foam can be a multilevel graphite foam, characterized by a first level, such as a core, having a first porosity, and then one or more additional layers, for instance shells, having different porosities. Generally, the first level will be characterized by greater pore size than the additional levels, and in preferred embodiments, the pore size is reduced in each level extending away from the core. In certain preferred embodiments, the multilevel graphite foam includes a first level, such as a core, having a first porosity, and a second level, such as a shell, having a second porosity. In some instances the pores in the second level are smaller than the pores in the first level, for instance, the second level can have an average pore size that is less than 50%, 40%, 30%, 20%, 10%, 5%, or 1% the average pore size of the pores in the first level. When present, the third level can be characterized by pores that have an average pore size that is less than 50%, 40%, 30%, 20%, 10%, 5%, or 1% the average pore size of the pores in the second level.

The first level can have an average pore size from 1-1,000 μm, 10-1,000 μm, 10-500 μm, 50-500 μm, 100-500 μm, 50-400 μm, 50-300 μm, 50-250 μm, 100-250 μm, 50-200 μm, or 75-150 μm. The second level can have an average pore size from 0.1-100 μm, 0.1-50 μm, 0.1-25 μm, 0.1-10 μm, 0.1-5 μm, 0.5-100 μm, 0.5-50 μm, 0.5-25 μm, 0.5-10 μm, 0.5-5 μm, 1-100 μm, 1-50 μm, 1-25 μm, 1-10 μm, 1-5

µm, 2-100 µm, 2-50 µm, 2-25 µm, 2-10 µm, 2-5 µm, 5-100 µm, 5-50 µm, 5-25 µm, 5-15 µm, 5-10 µm, 10-100 µm, 10-50 µm, 10-25 µm, 10-20 µm, or 10-15 µm.

The multilevel graphite foams are characterized by high surface area. For instance, the foams can have a BET surface area of at least 5.0 m$^2$/g, at least 5.5 m$^2$/g, at least 6.0 m$^2$/g, at least 6.5 m$^2$/g, at least 7.0 m$^2$/g, at least 7.5 m$^2$/g, at least 8.0 m$^2$/g, at least 8.5 m$^2$/g, at least 9.0 m$^2$/g, at least 9.5 m$^2$/g, or at least 10.0 m$^2$/g. In some instances, the foams can have an areal density of at least 0.01 mg$^2$/cm, at least 0.05 mg$^2$/cm, at least 0.10 mg$^2$/cm, at least 0.15 mg$^2$/cm, at least 0.20 mg$^2$/cm, at least 0.25 mg$^2$/cm, at least 0.30 mg$^2$/cm, at least 0.35 mg$^2$/cm, at least 0.40 mg$^2$/cm, at least 0.45 mg$^2$/cm, or at least 0.50 mg$^2$/cm. In some embodiments, the foams can have a volumetric surface area of at least 0.01 m$^2$/cm$^3$, at least 0.05 m$^2$ cm$^3$, at least 0.10 m$^2$/cm$^3$, at least 0.15 m$^2$/cm$^3$, at least 0.20 m$^2$/cm$^3$, at least 0.25 m$^2$/cm$^3$, at least 0.30 m$^2$/cm$^3$, at least 0.35 m$^2$/cm$^3$, at least 0.40 m$^2$/cm$^3$, at least 0.45 m$^2$/cm$^3$, at least 0.50 m$^2$/cm$^3$, at least 0.55 m$^2$/cm$^3$, at least 0.60 m$^2$/cm$^3$, at least 0.65 m$^2$/cm$^3$, at least 0.70 m$^2$/cm$^3$, at least 0.75 m$^2$/cm$^3$, at least 0.80 m$^2$/cm$^3$, at least 0.85 m$^2$/cm$^3$, at least 0.90 m$^2$/cm$^3$, at least 0.95 m$^2$/cm$^3$, or at least 1.0 m$^2$/cm$^3$.

The BET surface area, areal density, and volumetric surface area can be determined using the 5-point BET surface area test, such as performed by Pacific Surface Science Inc. Samples are prepared with nitrogen gas at 200° C. for 2 hours before test. The 5-point BET test is carried out by nitrogen adsorption at 77K. To obtain data with different units shown as above the planar area, mass, and volume of a sample can be combined with the total surface area of the sample (as provided by Pacific Surface Science Inc.).

The multilevel graphite foams can be combined with a variety of pseudocapacitive materials. Exemplary pseudocapacitive materials include transition metals, for instance transition metal oxides and transition metal hydroxides. By way of example, the pseudocapacitor can include one or more manganese oxides, manganese hydroxides, ruthenium oxides, ruthenium hydroxides, iridium oxides, iridium hydroxides, iron oxides, iron hydroxides, cobalt oxides, cobalt hydroxides, nickel oxides, nickel hydroxides, rhodium oxides, rhodium hydroxides, platinum oxides, platinum hydroxides, palladium oxides, or palladium hydroxides.

The pseudocapacitor can include transition metal oxides having a spinel structure: $AB_2O_4$, wherein A and B are the same or different, and can be drawn from transition metals, for instance manganese, ruthenium, iridium, iron, cobalt, nickel, rhodium, platinum oxides, platinum, or palladium. In some embodiments, the pseudocapacitor can include $Mn_3O_4$, $Fe_3O_4$, $Co_3O_4$, as well as mixed transitional metal spinels such as $MnFe_2O_4$, $NiCo_2O_4$, and $MnCo_2O_4$.

The pseudocapacitor can be present on the exterior surfaces of the multilevel graphite foam as nanoparticles. The nanoparticles can have an average particle size from about 1-100 nm, about 1-50 nm, about 1-25 nm, about 1-15 nm, about 1-10 nm, about 5-100 nm, about 5-50 nm, about 5-25 nm, about 5-20 nm, about 5-15 nm, about 5-10 nm, about 10-100 nm, about 10-50 nm, about 10-25 nm, about 10-20 nm, about 15-100 nm, about 15-50 nm, about 15-25 nm, about 20-100 nm, about 20-75 nm, about 20-50 nm, about 20-40 nm, about 10-40 nm, about 10-30 nm, or about 25-35.

The pseudocapacitor can be present on the multilevel graphite foam with a loading density of at least 0.01 mg/cm$^2$, at least 0.05 mg/cm$^2$, at least 0.1 mg/cm$^2$, at least 0.15 mg/cm$^2$, at least 0.20 mg/cm$^2$, at least 0.25 mg/cm$^2$, at least 0.30 mg/cm$^2$, at least 0.35 mg/cm$^2$, at least 0.40 mg/cm$^2$, at least 0.50 mg/cm$^2$, at least 0.60 mg/cm$^2$, at least 0.75 mg/cm$^2$, or at least 1.0 mg/cm$^2$. In certain embodiments, the pseudocapacitor can be present on the multilevel graphite foam with a loading density from 0.05-1.0 mg/cm$^2$, 0.10-0.50 mg/cm$^2$, 0.20-0.50 mg/cm$^2$, 0.30-0.50 mg/cm$^2$, 0.25-0.40 mg/cm$^2$, or 0.25-0.35 mg/cm$^2$.

When sufficiently loaded, the nanoparticles can coalesce into a thin sheet covering the multilevel graphite foam. Such sheets can have a thickness no greater than 100 nm, no greater than 75 nm, no greater than 50 nm, no greater than 40 nm, no greater than 30 nm, no greater than 20 nm or no greater than 10 nm. In some instances, the sheets can have a thickness from 1-100 nm, from 1-75 nm, from 1-50 nm, from 1-40 nm, from 1-30 nm, from 5-50 nm, from 5-40 nm, from 5-30 nm, from 10-50 nm, from 10-40 nm, from 10-30 nm, from 20-50 nm, from 20-40 nm, or from 10-30 nm.

The supercapacitors can have an overall thickness that is at least 0.1 µm, at least 0.25 µm, at least 0.5 µm, at least 0.75 µm, at least 1.0 µm, at least 2.0 µm, at least 5 µm, or at least 10 µm. In some instances, the graphite network has a thickness no greater than about 500 µm, about 400 µm, about 300 µm, about 250 µm, about 200 µm, about 150 µm, about 100 µm, or about 50 µm. In some embodiments, the graphite network has a thickness between about 0.1-500 µm, 0.25-500 µm, 0.5-500 µm, 0.75-500 µm, 1-500 µm, about 10-500 µm, about 10-250 µm, about 25-250 µm, about 25-200 µm, or about 25-150 µm.

The supercapacitors disclosed herein do not need to include any binders, conductive additives or other polymeric materials. By reducing the amount of non-active material present in the supercapacitors, the overall weight of the device can be decreased, thereby enhancing the overall capacitance/mass ratio.

The supercapacitors disclosed herein are robust, and can undergo 1,000 bending cycles while experiencing only a slight change in electrical resistance. For instance, after 1,000 bending cycles, the supercapacitors disclosed herein can exhibit a change in resistance (relative to prior to the bending cycles) of less than 3.0%, less than 2.5%, less than 2.0%, less than 1.5%, less than 1.0%, or less than 0.5%.

The sensors disclosed herein are substantially robust even under heavy use. In contrast to other strain sensors, the sensors disclosed herein maintain their electrical resistance even after many strain/stretch events. For instance, the electrical resistance of the sensor can still be within 1.0%, 0.8%, 0.6%, 0.4%, or 0.2% of the original electrical resistance, after 5,000 bend cycles.

When used as electrodes, the supercapacitors have high overall specific capacitance. For instance, the capacitance can be at least 150 F/g, at least 200 F/g, at least 250 F/g, at least 300 F/g, at least 350 F/g, at least 400 F/g, at least 450 F/g, at least 500 F/g, based on the weight of the entire electrode. In some examples, the capacitance can be at least 150 F/g, at least 200 F/g, at least 250 F/g, at least 300 F/g, at least 350 F/g, at least 400 F/g, at least 450 F/g, or at least 500 F/g, based on the weight of the pseudocapacitive material. The supercapacitors retain their capacitance after repeated cycling. For instance, after 10,000 cycles at 10 A/g, the capacitance can be at least 75%, at least 80%, at least 85%, at least 90%, or at least 95% the initial capacitance.

The supercapacitors can be obtained by coating a pseudocapacitive material onto a multilevel graphite foam. The multilevel graphite foam can be obtained using a metal foam substrate. The metal foam substrate can be a commercially available metal foam, for instance a nickel foam, a copper foam, an iron foam, a zinc foam, an aluminum foam, or a tin foam. The foam can be plated with a metal, such as copper, nickel, iron, cobalt, gold, platinum, or rhodium, so long as the plating metal is different than the metal in the foam. The metal foam can be immersed in an electrolyte solution, wherein the electrolyte solution is in electrical communication with an electrode. The electrolyte solution can include metal ions, such as copper ions, nickel ions, iron ions, cobalt ions, gold ions, platinum ions, rhodium ions, and mixtures thereof. The ions can be provided in the form of metal salts. An electric current can be applied via the electrode in order to precipitate dissolved ions onto the surfaces of the metal foam substrate.

The plated foam is then annealed in order to install micropores under the surface of the metal foam struts. The annealed substrate can then be partially etched to give a multilevel metal substrate. By controlling the plating, annealing, and partial etching parameters, the porosity of the micropores can be controlled. For instance, for a sample geometry of 1.5 by 4 cm$^2$, the metal deposition can be conducted using electrodeposition depositing from 400-4,000 coulombs, from 400-3,000 coulombs, from 600-2,800 coulombs, from 600-2,400 coulombs, or from 800-2,400 coulombs. The annealing can be conducted at a temperature from 800-1,500° C., from 800-1,400° C., from 800-1,300° C., from 800-1,200° C., from 800-1,100° C., from 800-1,000° C., from 800-900° C., from 900-1,500° C., from 900-1,400° C., from 900-1,300° C., from 900-1,200° C., from 900-1,100° C., from 900-1,000° C., from 1,000-1,500° C., from 1,000-1,400° C., from 1,000-1,300° C., from 1,000-1,200° C., or from 1,000-1,100° C. The annealing time can be from 1-100 minutes, from 1-75 minutes, from 1-50 minutes, from 1-30 minutes, or from 5-30 minutes. The partial etching can be conducting electrochemically, for instance at a potential from +0.2-1.0 V (VS Ag/AgCl), from +0.3-0.9 V (VS Ag/AgCl), from +0.4-0.9 V (VS Ag/AgCl), from +0.5-0.9 V (VS Ag/AgCl), or from +0.5-0.8 V (VS Ag/AgCl). For a sample geometry of 1.5 by 4 cm$^2$, the electrochemical etching can be conducted using a charge from 100-1,000 coulombs, from 100-750 coulombs, from 100-500 coulombs, from 200-400 coulombs, or from 300-400 coulombs.

The multilevel graphite foam can be obtained using chemical vapor deposition or hydrothermal deposition. For instance, chemical vapor deposition can be performed with a carbon source, such as a $C_{2-4}$ hydrocarbon, including, but not limited to, ethylene, acetylene, propylene, propyne, butadiene and mixtures thereof. The deposition can be conducted using a carrier gas, for instance hydrogen. Generally, the deposition can be conducted at a temperature less than about 1,000° C., less than about 900° C., less than about 850° C., less than about 800° C., less than about 750° C., less than about 700° C., less than about 650° C., less than about 600° C., less than about 550° C., or less than about 500° C. In some embodiments, the deposition can be conducted at a temperature between about 500-1,000° C., between about 500-900° C., between about 600-900° C., between about 600-800° C., or between about 650-750° C. In some instances, the deposition is conducted at a temperature around 700° C.

After the carbon deposition, the metal can be removed to give a multilevel graphite foam. In the case of metal foams, the substrate can be removed by etching, for instance chemical etching, such as with one or more acids. In some instances, the substrate can be removed by treatment with a mineral acid, such as HCl, HBr, HI, HF, $HNO_3$, $H_2SO_4$, $H_3PO_4$, and mixtures thereof, optionally in combination with one or more Lewis acids, for instance a transition metal salt such as $FeCl_3$, $FeBr_3$, $BCl_3$, $BF_3$, $AlCl_3$, $AlBr_3$, $Al(OiPr)_3$, SnClr, $TiCl_4$, or $Ti(OiPr)_4$.

The pseudocapacitive material can be deposited on the multilevel graphite foam using any suitable method for generating metal nanoparticles. It is typically preferred that the nanoparticles are generated in the presence of the graphite foams. For instance, a metal salts may be chemically reduced, thermally decomposed or electrochemically reduced to give nanoparticles, which are deposited on the surface of the graphite foam. By selecting the rate of nanoparticle formation, as well as period of time for the reaction, the loading of the pseudocapacitive material on the graphite foam can be controlled.

A metal salt or hydroxide can be mixed with a reductant in a solvent, thereby precipitating metal nanoparticles. This process can optionally be conducted with heating, for instance, at least 50° C., at least 75° C., at least 90° C., at least 100° C., at least 125° C., or at least 150° C. The process can be conducted under pressure, for instance using an autoclave when the solvent is water. The reaction period can be from 5-360 minutes, from 5-240 minutes, from 5-180 minutes, from 5-120 minutes, from 25-120 minutes, from 50-120 minutes, from 60-150 minutes, or from 90-180 minutes.

In other embodiments, nanoparticles may be formed by forming a mixture of metal salt or hydroxide and solvent, and heating the mixture to a temperature sufficient to form nanoparticles. The mixture may further include a stabilizing agent, for instance a surfactant. The heating may be conducted in a closed pressure vessel. In some instances, the nanoparticles can be obtained by: dissolving a first metal salt in ethanol, heating the combination of the first metal salt and the ethanol to a first temperature sufficient to partially reduce metal ions of the first metal salt, adding an alkaline solution, to fully reduce the metal ions, thereby causing precipitation of nanoparticles.

The supercapacitor may be embedded in an elastomeric polymer. For instance, a PDMS elastomer may be formed from its component parts, and then partially cured to form a base. The supercapacitor may be placed in the base, and then covered with additional viscous, freshly mixed, PDMS. Wires may be affixed to the supercapacitor, either with or without terminals, before or after the network is placed into the base.

The supercapacitors can be advantageously deployed in full cells, which can be constructed by sandwiching an electrolyte between two supercapacitors. A supercapacitor can be attached to elastomer and fitted with conductive wire. Electrolyte can be embedded into the supercapacitor/elastomer composite, followed by placement of a separator and then more electrolyte. Finally, another supercapacitor/elastomer composite can be placed on top to complete the circuit. The supercapacitors can be the same, or different. Conventional separators can be used. Examples of separators include, but are not limited to, cellulose based separators, and polymer membranes (e.g. polypropylene/polyethylene, polyvinylidene fluoride). Conventional electrolytes, such as those known in the art, can be used. Examples of electrolytes include, but are not limited to, acidic, basic and neutral aqueous electrolytes; polyvinyl alcohol based gel electrolyte; and ionic electrolytes.

Disclosed herein are stretchable strain sensors including a graphite network embedded in an elastomeric material. The graphite struts can have a minimum thickness of at least 0.1 µm, at least 0.25 µm, at least 0.5 µm, at least 0.75 µm, at least 1.0 µm, at least 2.0 µm, at least 5 µm, or at least 10 µm. In some instances, the graphite network has a thickness no greater than about 500 µm, about 400 µm, about 300 µm, about 250 µm, about 200 µm, about 150 µm, about 100 µm, or about 50 µm. In some embodiments, the graphite network has a thickness between about 0.1-500 µm, 0.25-500 µm, 0.5-500 µm, 0.75-500 µm, 1-500 µm, about 10-500 µm, about 10-250 µm, about 25-250 µm, about 25-200 µm, or about 25-150 µm.

Whereas a graphene sheet typically consists of an array of $sp^2$ hybridized carbon atoms in a single sheet, the graphite network in the inventive sensors can have at least 10, at least 50, at least 75, at least 100, at least 200, or at least 500 carbon sheets.

As described herein, as the graphite network is mechanically flexed, bent, stretched, compressed, or twisted to change its shape or to change its size, the electrical characteristics such as resistivity, conductivity, and permittivity, of the graphite network can change in a repeatable manner so the graphite network operates over its range of elastic operations.

In some embodiments, the sensor includes two or more conductive wires in electrical communication with a graphite network that forms the sensor. The conductive wires are configured, in some embodiments, to apply a potential or carry a current from an electrical source to the graphite network so as to produce a corresponding measurable current or potential to which resistance or impedance of the graphite network can be ascertained. In some embodiments, a fixed electrical source applies a fixed current or voltage to measure the real-component (namely, the resistance or conductance) of the graphite network. In other embodiments, a varying electrical source applies a time-varying current or voltage to measure impedance of the graphite network. In some embodiments, the capacitance or inductive properties of the graphite network may be measured.

In some embodiments, the conductive wires are affixed to a terminal formed at an end of the graphite network. The terminal forms electrical contact with the graphite network. In other embodiments, the conductive wires are bonded directly to the graphite network. In other embodiments, the graphite network is formed around the conductive wires. Examples of materials of the conductive wires include metals, conductive polymers, and conductive carbonaceous materials.

The graphite network may be used to form sensors for any types of wearable devices. In some embodiments, the devices are configured as surface sensors that are placed on the surface of the skin. The devices may, for example, be placed over specific skeletal muscles or connective tissues to monitor movement thereof. The device may also be placed over organs such as the throat to measure presence or level of speech or sound or over the face to measure certain facial muscles.

In some embodiments, the wearable devices include circuitries to measure electrical properties of the graphite network. In some embodiments, the measurements are stored in local memory located in the device and then transmitted to remote storage device. In some embodiments, the device includes a communication transceiver (e.g., wireless or wired) that off-loads the stored data to a remote storage device. In some embodiments, the device includes a transferrable memory storage device, for instance a detachable thumb drive, in which measurements are stored and can be manually off-load the device.

In some embodiments, the graphite network sensor includes signal transduction elements such as piezoelectric or thermoelectric materials that generate energy via movements of the body. The signal transduction elements may be integrated with the graphite network in the sensor to form a composite layer. In other embodiments, the signal transduction elements form energy modules to which the graphite network sensor is connected.

In some embodiments, the graphite network sensor maybe attached to the body of a person. For example, the graphite network sensors may be embedded in dressings, or pads that may be affixed to external and internal body surfaces such as the skin or over certain skeletal muscles or various body organs as the heart, liver, stomach, blood vessels. In some embodiments, the dressing or pads may be delivered to internal tissues within the organ, e.g., within the chambers of the heart, the stomach, intestine, bladder, blood vessels, and, etc.

The graphite network can be embedded into an elastomeric material, for instance one or more polydimethylsiloxanes, polyurethanes, rubbers or silk fibers. The elastomeric material can fully surround the graphite network. The sensor can further be affixed to a tape or bandage suitable for attachment to a person, animal or article for which monitoring is desired.

Whereas previous graphene networks have to be coated a thin layer of polymer [poly(methyl methacrylate)] as a support to prevent the graphene network from collapsing during the chemical etching process, the sensors disclosed herein do not require additional polymeric materials (beyond the elastomer casing) and as such are simpler and more economical to prepare.

The sensors disclosed herein can have a gauge factor of at least about 5, at least about 10, at least about 15, at least about 20, at least about 25, at least about 30, at least about 40, at least about 50, at least about 75, or at least about 100, when measured at 100% tensile strength. In certain embodiments, the sensors disclosed herein can have a gauge factor between 5-100, between 10-100, between 25-100, or between 25-75, when measured at 100% tensile strength.

The sensors disclosed herein can have a gauge factor of at least about 10, at least about 25, at least about 50, at least about 75, at least about 100, or at least about 125, when measured at 80% tensile strength. In certain embodiments, the sensors disclosed herein can have a gauge factor between 10-150, between 25-150, between 50-150, between 75-150, or between 75-125, when measured at 80% tensile strength.

The sensors disclosed herein are substantially robust even under heavy use. In contrast to other strain sensors, the sensors disclosed herein maintain their electrical resistance even after many strain/stretch events. For instance, the electrical resistance of the sensor can still be within 1.0%, 0.8%, 0.6%, 0.4%, or 0.2% of the original electrical resistance, after 5,000 bend cycles. In some embodiments, after 5,000 bend cycles, the electrical resistance of the sensor is no less than 97.5%, 99%, 99.5%, 99.8% or 99.95% of the original electrical resistance Repeated bend cycles can be performed on a 1×2 cm strut, wherein the strut is bent to a radius of 1.7 mm at a rate of 3 mm/s. The strut can be immobilized on one end, for instance using clips, while the other end is fastened to a controllably movable fixture, also using clips. The exposed strut available to bend has a size of 1×1 cm. As the strut is continuously cycled between the bent and unbent shape, resistance is collected in real time simultaneously. The test can be repeated for 2,500 cycles, 5,000 cycles, 7,500 cycles, 10,000 cycles or 15,000 cycles. After these tests, the electrical resistance can be within 0.2% of the original electrical resistance.

The sensors disclosed herein may be obtained by first forming a graphite network. In some embodiments, the network can be formed on a removable substrate. Suitable substrates include metal foams, which by way of example include nickel, copper, iron, ruthenium, or iridium, as well as alloys thereof, e.g., nickel/copper. In some instances, the substrate can have a uniform thickness, for instance a thickness no greater than about 500 µm. In some cases, the substrate has a thickness between about 100-500 µm. Uniform substrates can be obtained by rolling or other techniques known in the art.

The graphite network can be obtained using chemical vapor deposition or hydrothermal deposition. For instance, chemical vapor deposition can be performed with a carbon source, such as a $C_{2-4}$ hydrocarbon, including, but not limited to, ethylene, acetylene, propylene, propyne, butadiene and mixtures thereof. The deposition can be conducted using a carrier gas, for instance hydrogen. Generally, the deposition can be conducted at a temperature less than about 1,000° C., less than about 900° C., less than about 850° C., less than about 800° C., less than about 750° C., less than about 700° C., less than about 650° C., less than about 600° C., less than about 550° C., or less than about 500° C. In some embodiments, the deposition can be conducted at a temperature between about 500-1,000° C., between about 500-900° C., between about 600-900° C., between about 600-800° C., or between about 650-750° C. In some instances, the deposition is conducted at a temperature around 700° C. We tune the thickness by varying the deposition conditions, such as growth time. The thickness of struts is determined by measuring the areal density of the obtained samples. Given the surface area, we can obtain the thickness of graphite.

After the graphite network has been prepared, the substrate can be removed to give a flexible graphite network. In the case of metal foams, the substrate can be removed by etching, for instance chemical etching, such as with one or more acids. In some instances, the substrate can be removed by treatment with a mineral acid, such as HCl, HBr, HI, HF, $HNO_3$, $H_2SO_4$, $H_3PO_4$, and mixtures thereof, optionally in combination with one or more Lewis acids, for instance a transition metal salt such as $FeCl_3$, $FeBr_3$, $BCl_3$, $BF_3$, $AlCl_3$, $AlBr_3$, $Al(OiPr)_3$, $SnClr$, $TiCl_4$, or $Ti(OiPr)_4$.

After the substrate is removed, the network may be embedded in an elastomeric polymer. For instance, a PDMS elastomer may be formed from its component parts, and then partially cured to form a base. The graphite network may be placed in the base, and then covered with additional viscous, freshly mixed, PDMS. Wires may be affixed to the graphite network, either with or without terminals, before or after the network is placed into the base.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1: Synthesis of Graphite Network Sensor

Figure 2:
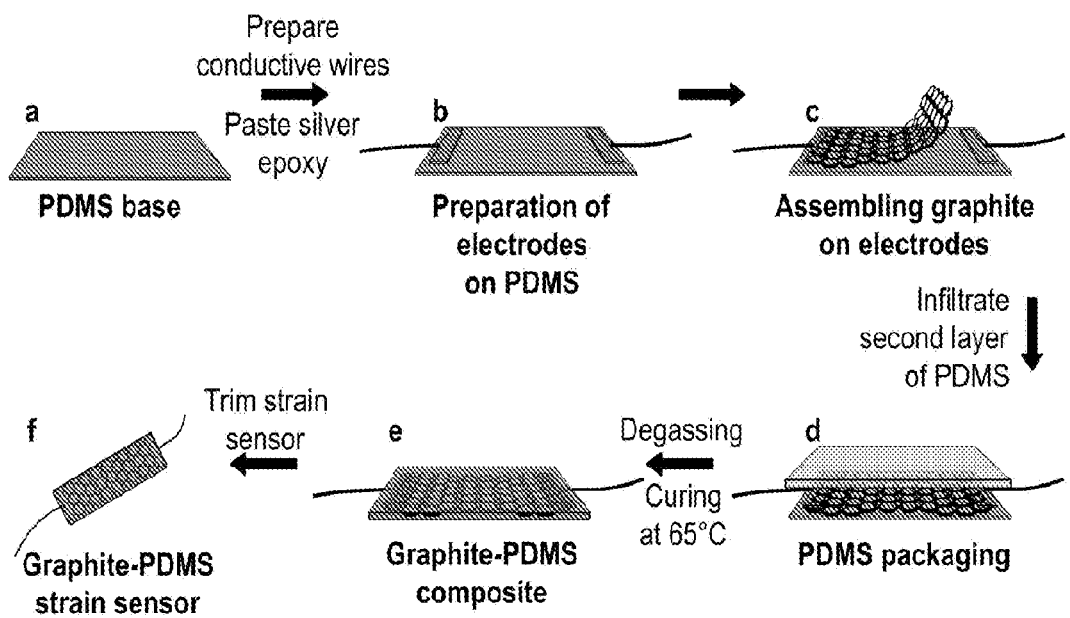
FIG. 2 includes a depiction of a fabrication process for embedding the graphite network into an elastomer.
Figure 3:
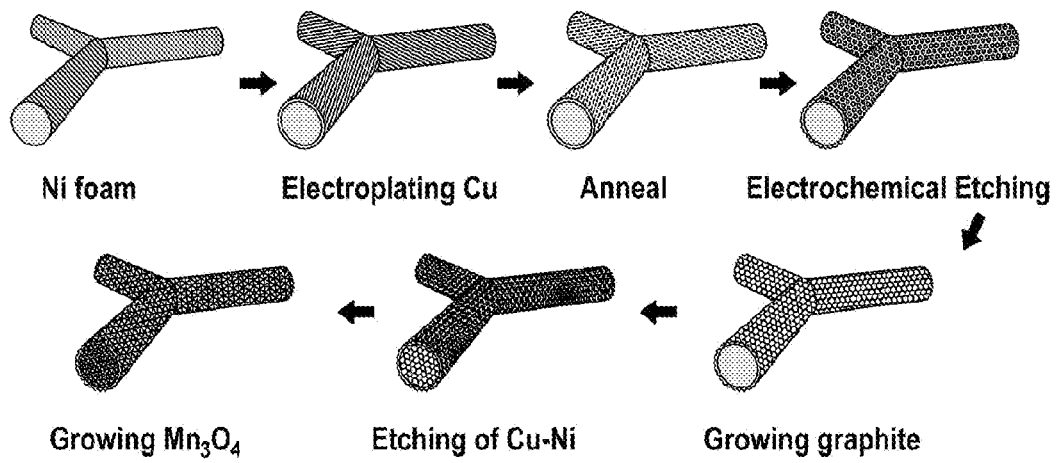
FIG. 3 includes a depiction a fabrication process of multilevel porous graphite/$Mn_3O_4$ (MPGM) composite foam.

A piece of Ni foam with three-dimensional (3-D) interconnected struts was rolled to 200 µm in thickness. Then the processed Ni foam was loaded into the stable heating zone of a quartz tube furnace at 700° C. in a continuous hydrogen flow ($H_2$, 99.9999%) at 20 SCCM for 40 min. This process cleans oxides from the surface of the Ni foams. Then ethylene ($C_2H_4$, 99.9999%, flow rate 10 SCCM) was introduced together with $H_2$ (99.9999%, 20 SCCM) to initiate the growth of graphite on the Ni foams catalysts. The reaction continued for 30 hours before the sample was cooled to the room temperature in the same gas mixtures of $C_2H_4$ and $H_2$. The sample was cooled to the room temperature by turning off the heater and opening the top cover of the furnace. Next, the obtained samples were immersed into a solution made of a mixture of iron chloride ($FeCl_3$, 1 M) and hydrochloride (HCl, 2M) at room temperature overnight, completely removing the metallic Ni foams. Rinsing with deionized water several times and drying at 60° C. for 4 hours in ambient atmosphere gave the 3-D freestanding flexible graphite scaffolds for the strain sensors Example 2: Fabrication Process of Graphite-Polymer Composite Strain Sensors The graphite-polymer composite strain sensors were fabricated in four steps: first, the elastomer poly(dimethyl siloxane) (PDMS) liquid was prepared from a mixture of the base PDMS and curing agent with a mass ratio 10:1 followed by degassing in a vacuum oven for 1 hour at ambient temperature. Then the viscous PDMS liquid was spin-coated on a glass slide at 500 rpm/s for 30 sec and cured at 65° C. in air for 1 hour immediately afterward. The cured PDMS formed the base of the graphite-polymer composite sensors. Next, two conductive wires (0.5 mm in diameter) were positioned at the two ends of the PDMS polymer film base. Then, a tiny amount of sliver epoxy was pasted on the wires with a dimension as shown in FIG. 2-b. Then, a piece of graphite scaffold was trimmed to 2 cm×1 cm and assembled on top of these two electrodes. Finally, the top PDMS layer was formed by filling freshly prepared PDMS liquid into the graphite scaffolds via spin coating at 200 rpm/s for 30 sec and curing at 65° C. for 1 hour. In order to make the PDMS completely fill into the graphite scaffolds, before the filtration, the sample is degassed for 1 hour.

Example 3: Fabrication of Porous Copper-Nickel Foams

A piece of nickel foam (MTI Corporation) was rolled to a thickness of 200 µm and then soaked in 1M sulfuric acid ($H_2SO_4$) for 20 min to remove the native nickel oxide layer. Then, the electrodeposition of Cu films is operated at −1.8V (vs. Ag/AgCl, 3M NaCl) in a three-electrode electrochemical cell setup. The electrolyte is made of copper sulfate ($CuSO_4$, 2M) and boracic acid ($H_3BO_3$, 1M). The high electric potential of −1.8 V (vs. Ag/AgCl, 3M NaCl) is chosen to ensure a high deposition rate of ~1.3 mg cm$^{-2}$ min$^{-1}$) and uniform coating of Cu on the 3-D Ni foams. The thickness of Cu layer can be readily tuned by the amount of charges passing through the circuit. Here we deposit 800 coulombs for fabricating porous Cu—Ni with feature pores of 1.9 μm. Then, the Ni—Cu composite foams are annealed at a temperature of 1000° C. in a gas flow of hydrogen (H$_2$, 5 sccm) and nitrogen (N$_2$, 50 sccm) of 420 mTorr for 5 min. Finally, the annealed composite is electrochemically etched at +0.6 V (vs. Ag/AgCl, 3M NaCl; electrolyte: 2M CuSO$_4$ and 1M H$_3$BO$_3$) for 350 coulombs, which results in large arrays of micropores uniformly distributed on the interconnected microstruts of the foams. Porous Cu—Ni foams with different average pore sizes can be made using a similar procedure.

| Average Pore Size (μm) | Cu Deposition (−1.8 V vs Ag/AgCl) | Annealing (5 sccm H$_2$, 50 sccm N$_2$) | | Electrochemical Etching (+0.6 V vs Ag/AgCl) |
|---|---|---|---|---|
| | | Temp. (° C.) | Time (min) | |
| 1.9 | 800 coulombs | 1000 | 5 | 350 coulombs |
| 2.0 | | | 15 | |
| 2.8 | | | 30 | |
| 2.0 | | 1100 | 5 | |
| 2.6 | | | 15 | |
| 3.9 | | | 30 | |
| 3.4 | 1600 coulombs | 1100 | 5 | |
| 4.6 | | | 15 | |
| 5.4 | | | 30 | |
| 4.8 | 2400 coulombs | 1100 | 5 | |
| 5.6 | | | 15 | |
| 8.3 | | | 30 | |

Example 4: Fabrication of Single-Level and Multilevel Porous Graphite Foam

The reaction starts with the annealing of single-level or multilevel porous nickel foams in H$_2$ gas flow (20 sccm) at 700° C. for 40 minutes for the removal of surface oxides. Then ethylene (C$_2$H$_4$, 10 sccm) is introduced to grow ultrathin graphite on the nickel foam catalysts with a total pressure of 400 mTorr for controlled growth of graphite. The reaction time ranged from 2.5 hr to 5 hr, which determines the areal mass density of graphite foam. Next, the temperature of the sample is rapidly reduced to room temperature in the original growth gas mixture. By selective etching Cu—Ni alloy catalysts in a mixture of iron chloride (FeCl$_3$, 1 M) and hydrochloric acid (HCl, 2 M) at 60° C. overnight, free standing graphite foams can be obtained. Next the ultrathin graphite foam is rinsed with deionized water and isopropanol for few times, and finally dried at 60° C. for 4 hr.

Example 5: Coating of Mn$_3$O$_4$ Nanoparticles on Graphite Foams

A 1 cm by 2 cm graphite foam, either single-level or multi-level porous, was immersed in 4 M HNO$_3$ at 50° C. for two hours to activate the surface of the graphite to be hydrophilic. Then the samples were washed with deionized water and dried at 60° C. for 6 hours. After that, potassium permanganate (KMnO$_4$, 0.1 M) and sodium nitrate (NaNO$_3$, 0.1 M) were mixed 1:1 under vigorous stirring. Subsequently, the well-mixed solution was transferred into a 30 mL autoclave and heated to 150° C. for the preset time (30, 60, 90 and 120 min for SPG; 10, 20, 30, 60, 90 and 120 min for MPG). Finally, the obtained graphite/Mn$_3$O$_4$ foams were washed with deionized water several times before drying at 60° C. for 10 hours.

Electrochemical Properties of Mn$_3$O$_4$ Supercapacitors:

| Current Collector | Electrolyte | Highest Capacitance (F g$^{-1}$) | Cycle life |
|---|---|---|---|
| SPG (0.3 mg/cm$^2$; 15 mg/cm$^3$) | 1M Na$_2$SO$_4$ | 798 (v = 1 mV s$^{-1}$) net weight | 90%/10,000 cycles |
| MPG (0.15 mg/cm$^2$; 7.5 mg/cm$^3$) | 1M Na$_2$SO$_4$ | 538 (v = 1 mV s$^{-1}$) net weight | 90%/10,000 cycles |
| | | 456 (v = 5 mV s$^{-1}$) net weight | |
| | | 445 (i = 1 A g$^{-1}$) net weight | |
| | | 260 (v = 1 mV s$^{-1}$) total weight | |
| | | 253 (i = 1 A g$^{-1}$) total weight | |
| | | [−0.2 to 1 V, vs Ag/AgCl] | | v: scanning rate; i: discharge current.

Electrochemical Properties of other Mn$_3$O$_4$ Supercapacitors:

| Nature of Mn$_3$O$_4$ | Current Collector | Electrolyte | Highest Capacitance (F g$^{-1}$) | Cycle life | Ref |
|---|---|---|---|---|---|
| MWCNT/Mn$_3$O$_4$ powder | Glassy carbon (1.42 g cm$^{-3}$) | 2M KCl | 420 (v = 5 mV s$^{-1}$) | 82%/400 cycles | 2 |
| Film | Stainless steel (8 g cm$^{-3}$) | 1M Na$_2$SO$_4$ | 314 (v = 5 mV s$^{-1}$) | | 3 |
| Graphene/Mn$_3$O$_4$ powder | Nickel foam (40 mg cm$^{-2}$) | 1M Na$_2$SO$_4$ | 114 (v = 5 mV s$^{-1}$) | 100%/10,000 cycles | 4 |
| Graphene/Mn$_3$O$_4$ powder | Nickel Grid (15 mg cm$^{-2}$) | 1M Na$_2$SO$_4$ | 236.7 (i = 1 A g$^{-1}$) | 93.68%/1000 cycles | 5 |
| Mn$_3$O$_4$/RGO hydrogel | Carbon flake (2 g cm$^{-3}$) | 1M Na$_2$SO$_4$ | 148 (i = 1 A g$^{-1}$) | 100%/1200 cycles | 6 |
| Mn$_3$O$_4$/Carbon black | Ni foam (40 mg cm$^{-2}$) | 0.5M Na$_2$SO$_4$ | 154 (i = 0.1 A g$^{-1}$) | 93.7%/1000 cycles | 7 |
| Mn$_3$O$_4$/Graphene | Stainless foil (8 g cm$^{-3}$) | 1M Na$_2$SO$_4$ | 225 (v = 5 mV s$^{-1}$) | 100%/1000 cycles | 8 |
| Cr doped Mn$_3$O$_4$ | Ni mesh (15 mg cm$^{-2}$) | 1M Na$_2$SO$_4$ | 272 (i = 0.5 A g$^{-1}$) | 70%/1000 cycles | 9 |
| Mn$_3$O$_4$/Amorphous carbon | Graphite sheet (1 g cm$^{-3}$) | 1M Na$_2$SO$_4$ | 522 (i = 1 A g$^{-1}$) | 100%/1400 cycles | 10 |
| Mn$_3$O$_4$/MWCNT | Stainless Steel (8 g cm$^{-3}$) | 1M Na$_2$SO$_4$ | 257 (v = 5 mV s$^{-1}$) | 85%/1000 cycles | 11 |

| Nature of $Mn_3O_4$ | Current Collector | Electrolyte | Highest Capacitance (F g$^{-1}$) | Cycle life | Ref |
|---|---|---|---|---|---|
| Graphene/$Mn_3O_4$ | Stainless Steel (8 g cm$^{-3}$) | 1M $Na_2SO_4$ | 270.6 (i = 0.2 A g$^{-1}$) | 91%/1500 cycles | 12 |
| $Mn_3O_4$/MWCNT | Glassy carbon (1.42 g cm$^{-3}$) | 1M $Na_2SO_4$ | 441 (v = 2 mV s$^{-1}$) | 98%/1000 cycles | 13 |
| Porous $Mn_3O_4$ | Not mentioned | 1M $Na_2SO_4$ | 302 (i = 0.5 A g$^{-1}$) | 89%/5000 cycles | 14 |
| $Mn_3O_4$/RGO | Ni foam (40 mg cm$^{-2}$) | 1M KOH | 517 (i = 1 A g$^{-1}$) |  | 15 |
| $Mn_3O_4$ | Carbon fabric (780 mg cm$^{-3}$) | 1M $Na_2SO_4$ | 670 (1 mV s$^{-1}$) | 100%/10,000 cycles | 16 |

All specific capacitance values from literature are calculated on the basis of the net weight of active materials, even not including the mass contribution of conductive additives, binders, and current collectors.

[2] G. An; P. Yu; M. Xiao; Z. Liu; Z. Miao; K. Ding; L. Mao, *Nanotechnology* 2008, 19, 275709
[3] D. P. Dubal; D. S. Dhawale; R. R. Salunkhe; S. M. Pawar; C. D. Lokhande, *Appl. Surf. Sci.* 2010, 256, 4411
[4] J. W. Lee; A. S. Hall; J.-D. Kim; T. E. Mallouk, *Chem. Mater.* 2012, 24, 1158
[5] D. Wang; Y. Li; Q. Wang; T. Wang, *Eur. J. Inorg. Chem.* 2012, 2012, 628
[6] L. Li; Z. Hu; Y. Yang; P. Liang; A. Lu; H. Xu; Y. Hu; H. Wu, *Chin. J. Chem.* 2013, 31, 1290
[7] K.-S. Kim; S.-J. Park, *Bull. Korean Chem. Soc.* 2013, 34, 2343
[8] Y. Wu; S. Liu; H. Wang; X. Wang; X. Zhang; G. Jin, *Electrochim. Acta* 2013, 90, 210
[9] R. Dong; Q. Ye; L. Kuang; X. Lu; Y. Zhang; X. Zhang; G. Tan; Y. Wen; F. Wang, *ACS Appl. Mater. Interfaces* 2013, 5, 9508
[10] S. Nagamuthu; S. Vijayakumar; G. Muralidharan, *Energy Fuels* 2013, 27, 3508
[11] K. Jang; S.-W. Lee; S. Yu; R. R. Salunkhe; I. Chung; S. Choi; H. Ahn, *Bull. Korean Chem. Soc.* 2014, 35, 2974
[12] G. Jin; X. Xiao; S. Li; K. Zhao; Y. Wu; D. Sun; F. Wang, *Electrochim. Acta* 2015, 178, 689
[13] C. Mondal; D. Ghosh; T. Aditya; A. K. Sasmal; T. Pal, *New J. Chem.* 2015, 39, 8373
[14] Y. Qiao; Q. Sun; J. Xi; H. Cui; Y. Tang; X. Wang, *J. Alloys Compd.* 2016, 660, 416
[15] X. Yang; Y. He; Y. Bai; J. Zhang; L. Kang; H. Xu; F. Shi; Z. Lei; Z.-H. Liu, *Electrochim. Acta* 2016, 188, 398
[16] Q. Y. Liao; S. Y. Li; H. Cui; C. Wang, *J. Mater. Chem. A* 2016, 4, 8830

Example 6: Synthesis of LiCl/PVA Gel Electrolyte

Polyvinylalcohol (PVA, 4 g) was gradually added into deionized water (40 mL) with vigorous stirring. The solution was heated to 80-85° C. and vigorously stirred for 1 hour till PVA is completely dissolved. Lithium chloride (LiCl, 8.5 g) was added into the transparent solution followed by stirring till a homogeneous sticky solution is formed. Finally, the solution was cooled to room temperature, and the clear and transparent gel was obtained.

Example 7: Assembly of Symmetric Supercapacitors

Figure 4:
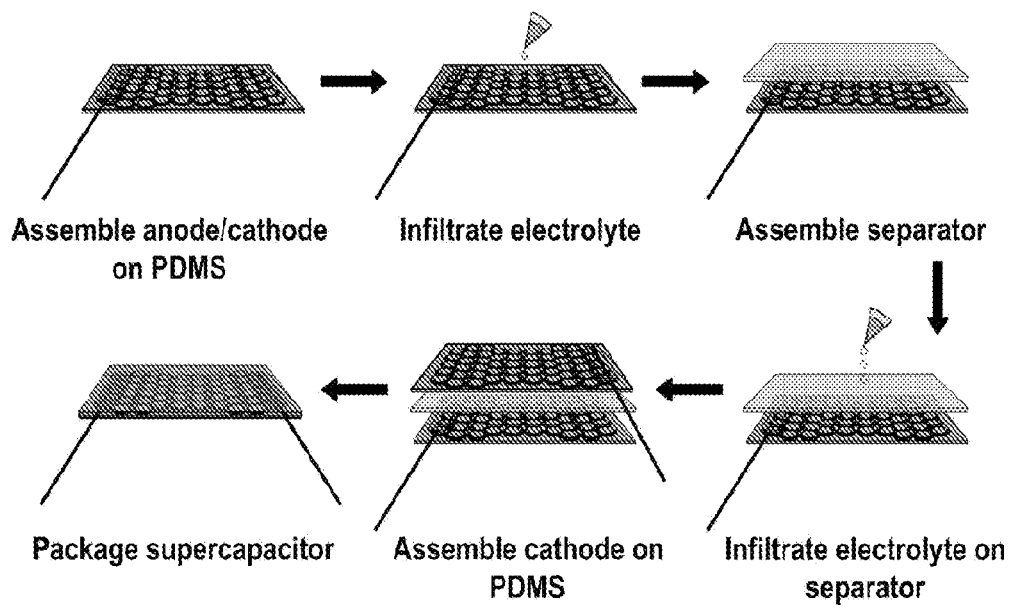
FIG. 4 includes a depiction of an assembly process of flexible MPGM symmetric supercapacitors.
Figure 5:
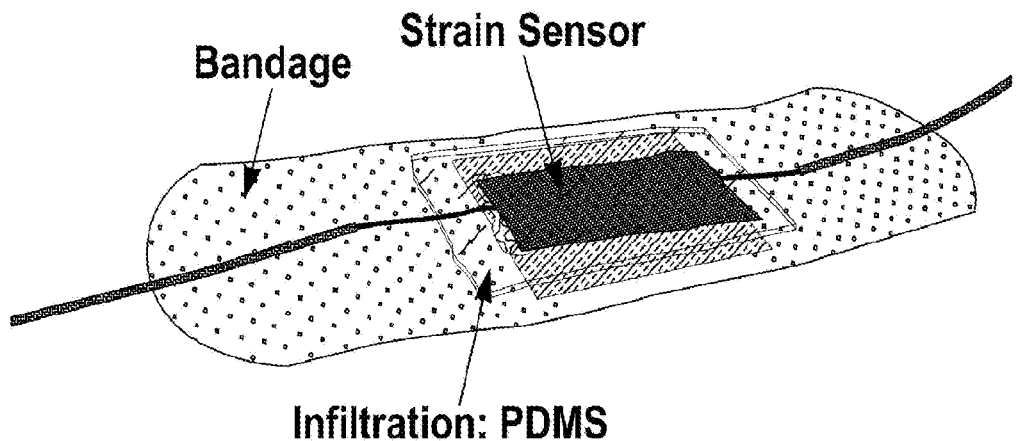
FIG. 5 includes a depiction of a strain sensor.
Figure 6:
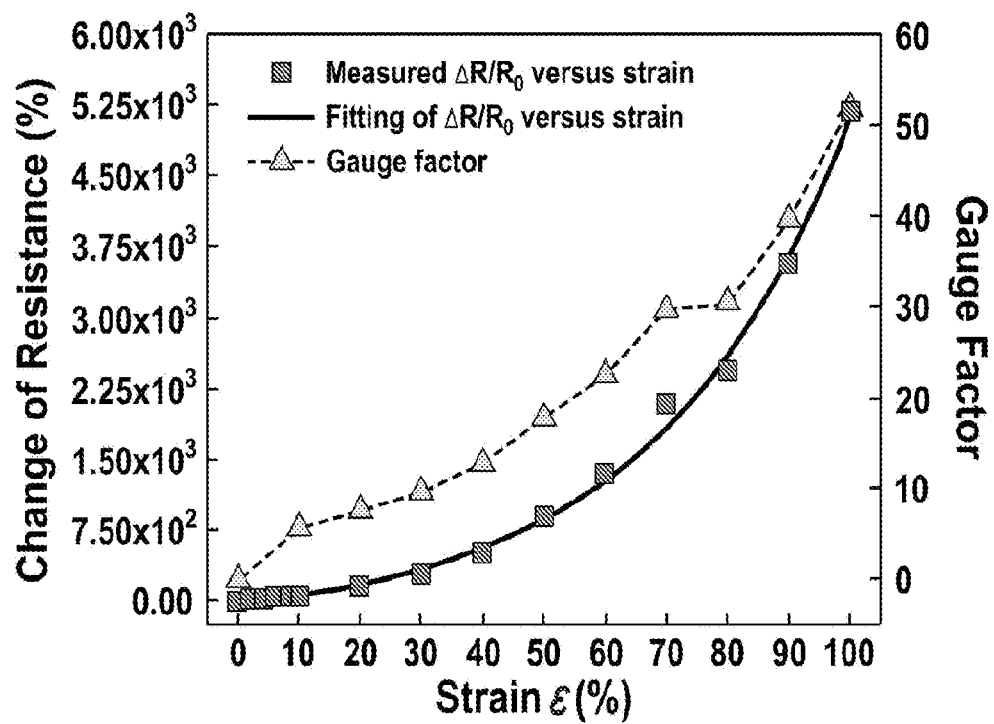
FIG. 6 includes a depiction of the of the relative resistance change and gauge factors vs. strain FIG. 7 includes a depiction the detection of vertical pressures using a strain sensor.
Figure 7:
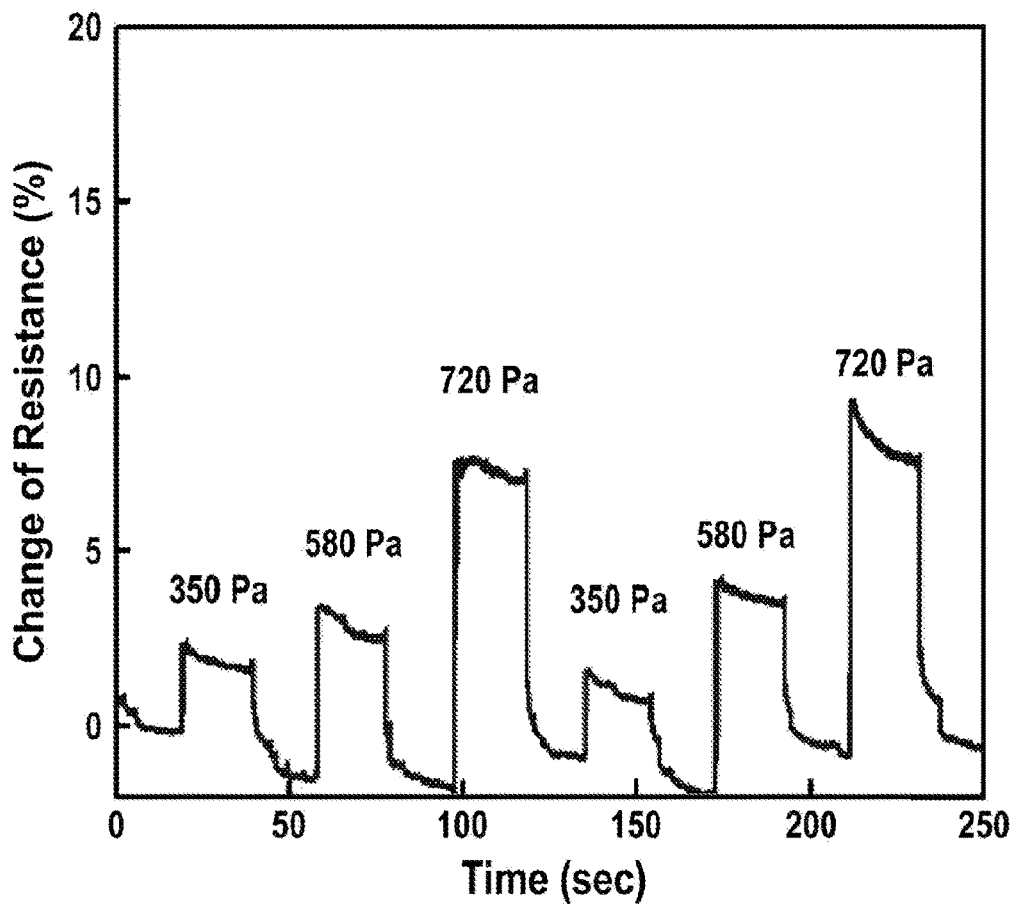
Figure 8:
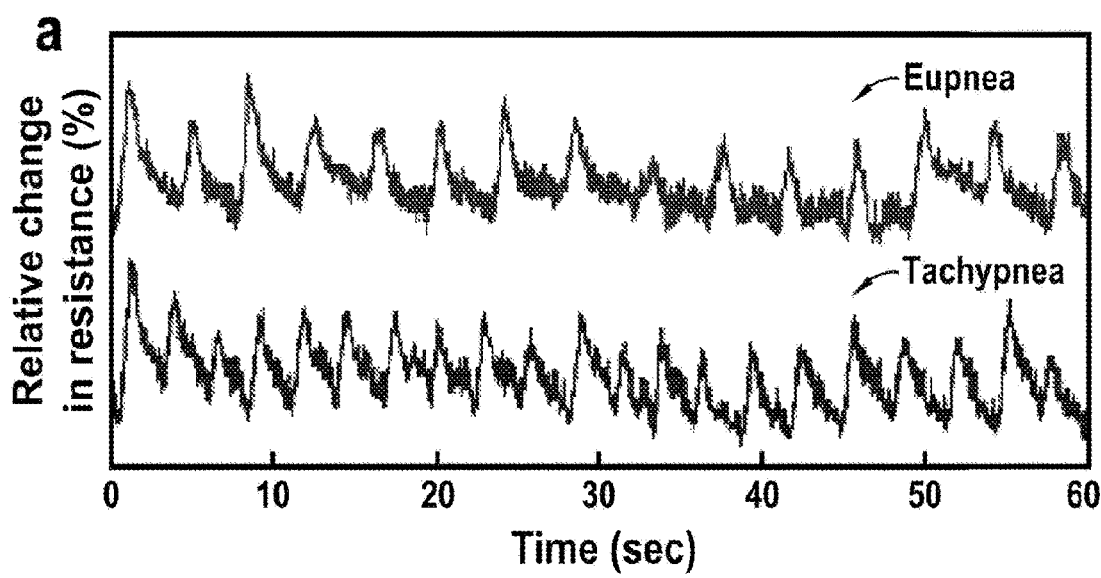
FIG. 8 includes a depiction of the detection of the respiratory rate of eupnea and tachypnea using a strain sensor.
Figure 9:
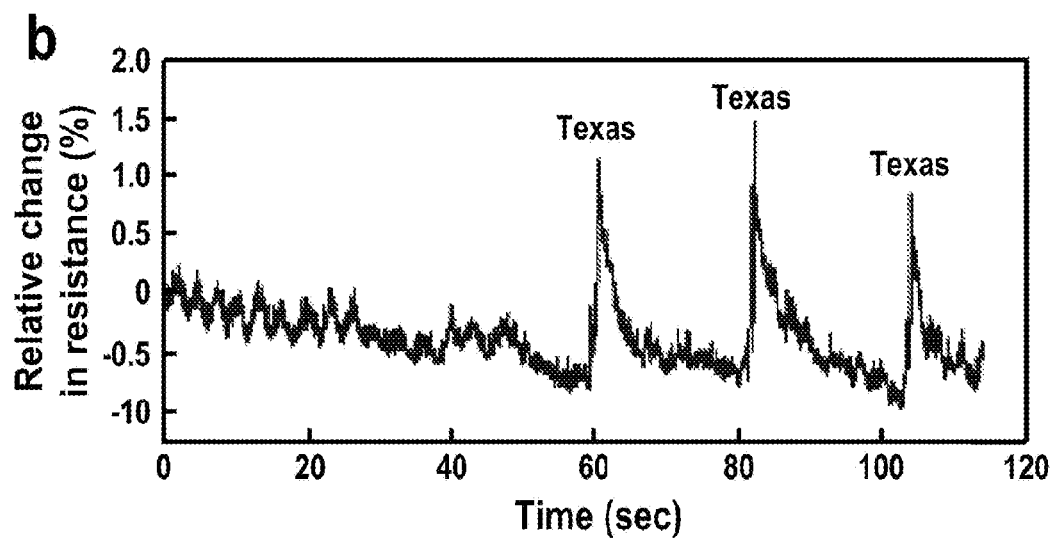
FIG. 9 includes a depiction of speech characteristics when speaking the word "Texas" three times using a strain sensor.
Figure 10:
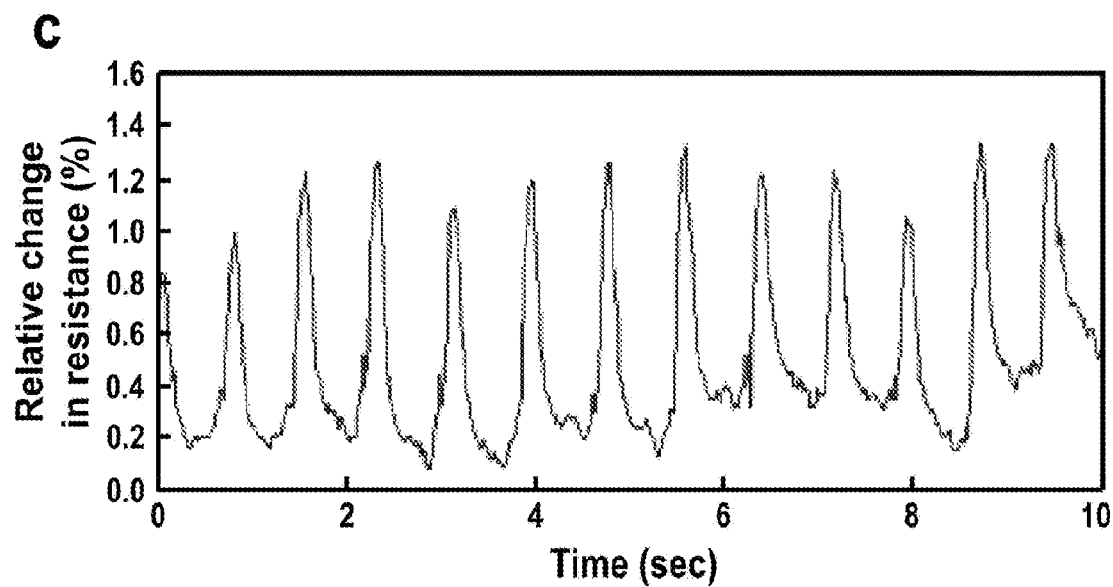
FIG. 10 includes a depiction of the pulse wave detected of a carotid artery using a strain sensor.
Figure 11:
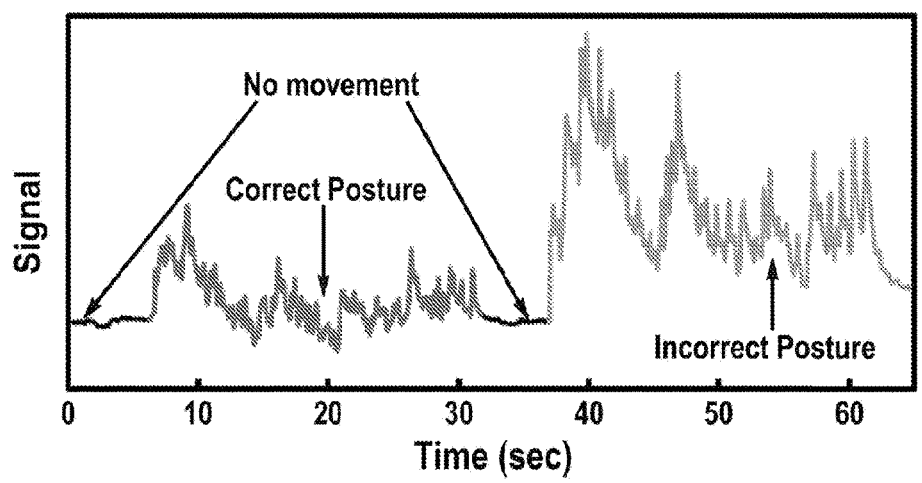
FIG. 11 includes a depiction of the detection of correct and incorrect posture of violin players using a strain sensor.
Figure 12:
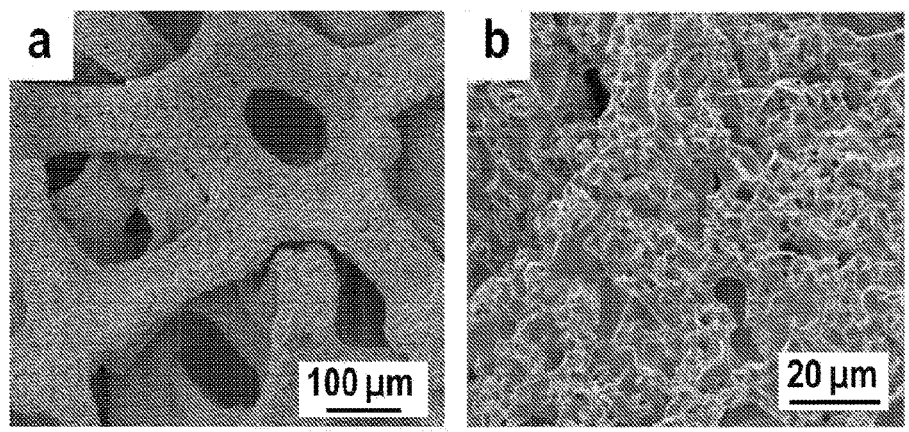
FIG. 12 includes a depiction of scanning electron microscopy (SEM) images of engineered multilevel porous Cu—Ni foams.
Figure 13:
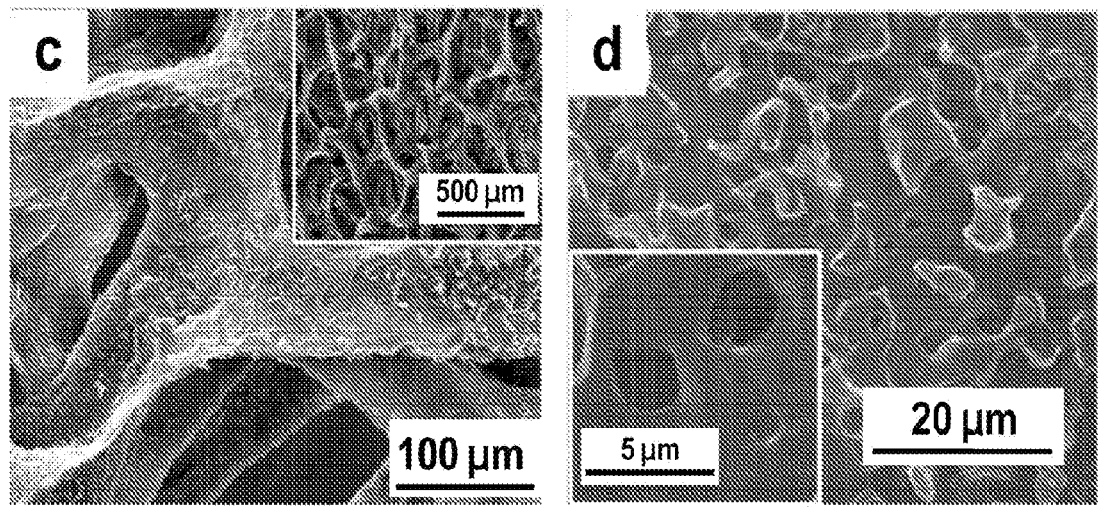
FIG. 13 includes a depiction of SEM of 3-D ultrathin multilevel porous graphite foam (MPG) of ~1.9 μm in pore size.
Figure 14:
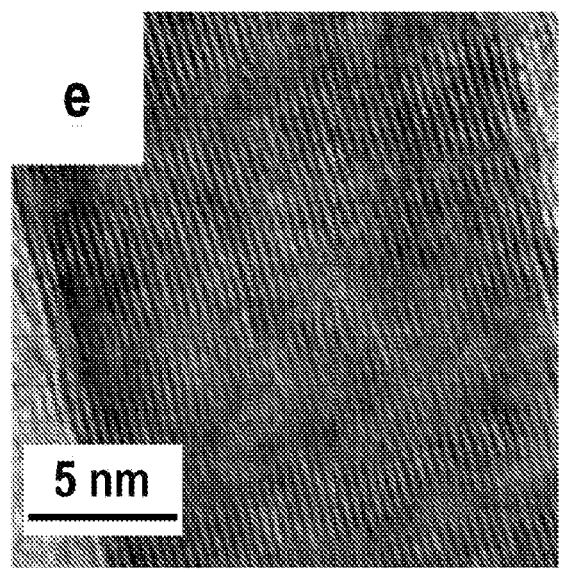
FIG. 14 includes a depiction of Transmission Electron Microscopy (TEM) characterization of MPG.
Figure 15:
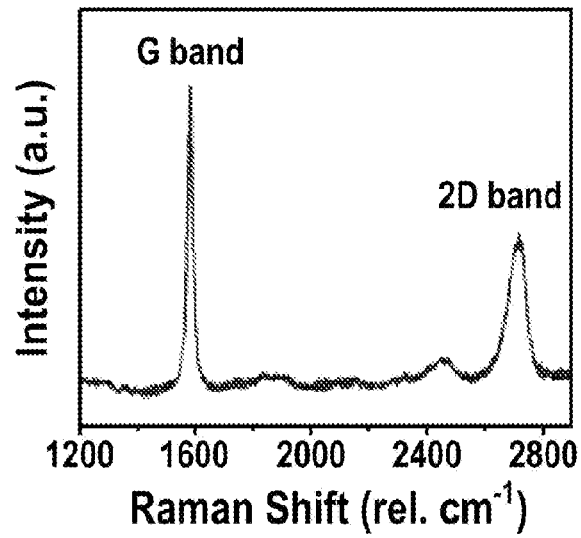
FIG. 15 includes a depiction of Raman spectrum of MPG.
Figure 16:
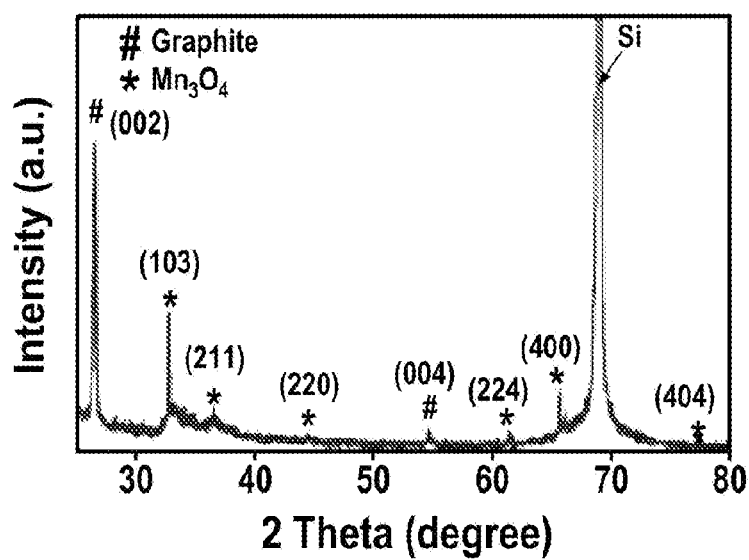
FIG. 16 includes a depiction of XRD of multilevel porous graphite foam/$Mn_3O_4$ (MPGM) (60 hr in reaction time).
Figure 17:
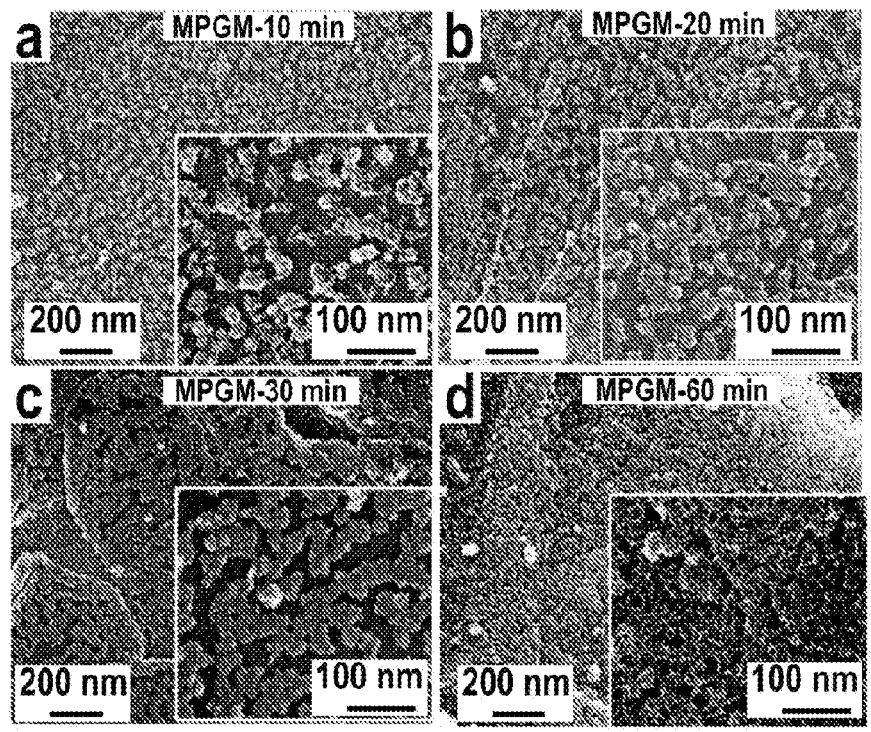
FIG. 17 includes a depiction of SEM characterization of MPGM composites with different growth time of $Mn_3O_4$ (a-d) 10 min, 20 min, 30 min and 60 min.
Figure 18:
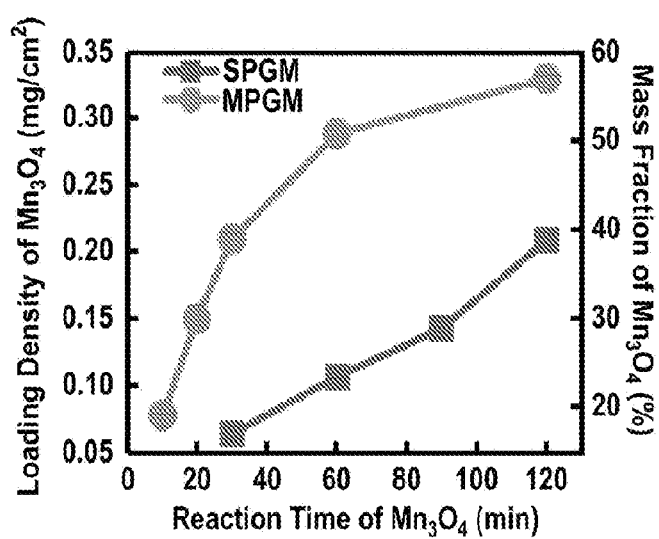
FIG. 18 include a depiction of loading density of $Mn_3O_4$ and mass fraction percentage on 5 hr-SPGM (square) and 5 hr-MPGM (circle) supports.
Figure 19:
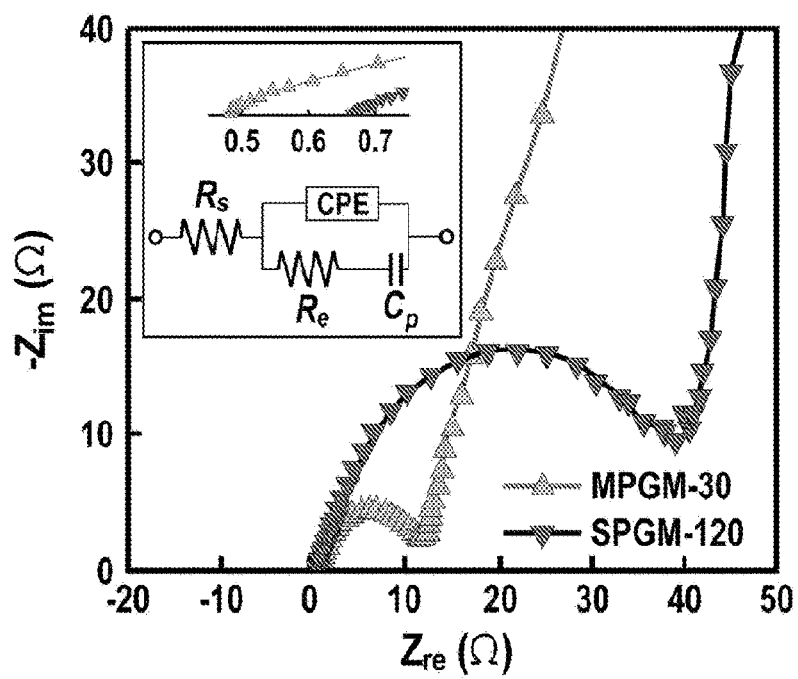
FIG. 19 includes a depiction of Electrochemical impedance spectroscopy (EIS) of $Mn_3O_4$ loaded on SPGM and MPGM graphite substrates (same loading of active materials, ~0.21 mg cm$^{-2}$); the inset depicts (top) zoom-in view of EIS at low $Z_{re}$ and (bottom) equivalent circuit.
Figure 20:
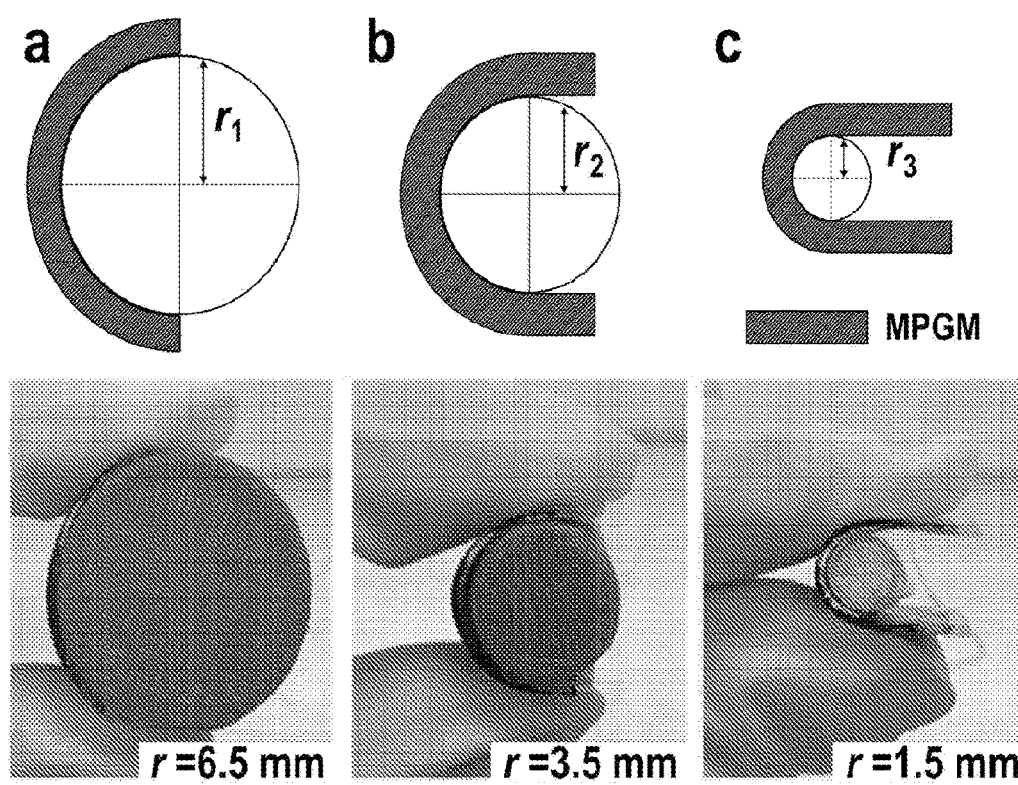
FIG. 20 includes a depiction of bending characterization of MPGM (growth time 60 min) (a-c) Schematic and corresponding photographs of MPGM tested at different bending radii. The tests of SPGM are conducted in the same manner.
Figure 21:
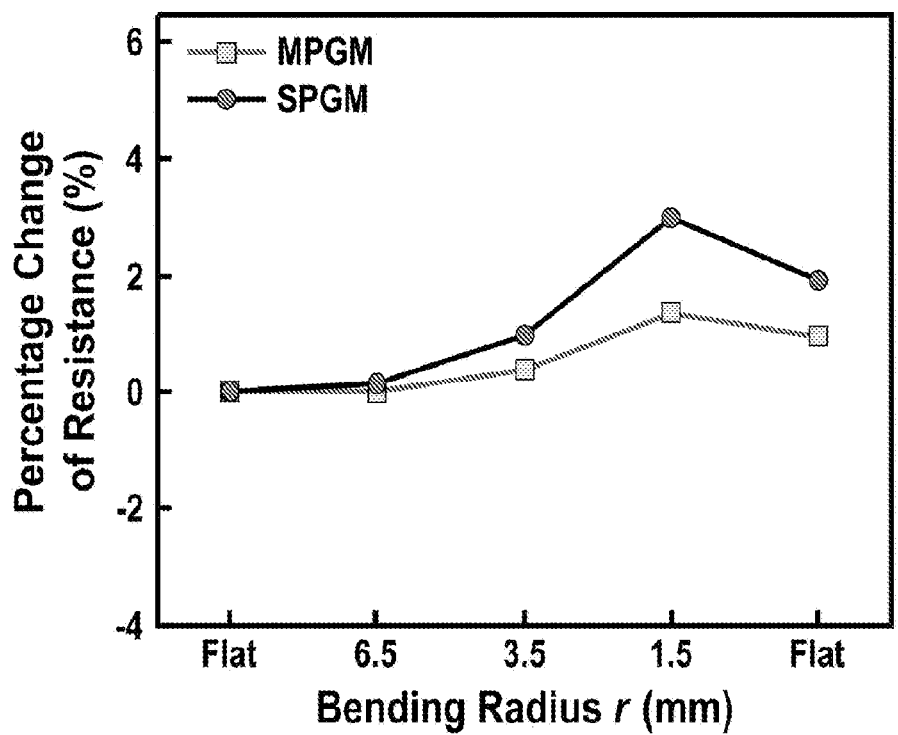
FIG. 21 includes a depiction of the change of electric resistance of MPGM (embedded in PDMS) and SPGM (embedded in PDMS) at various bending radii (first bending cycle).
Figure 22:
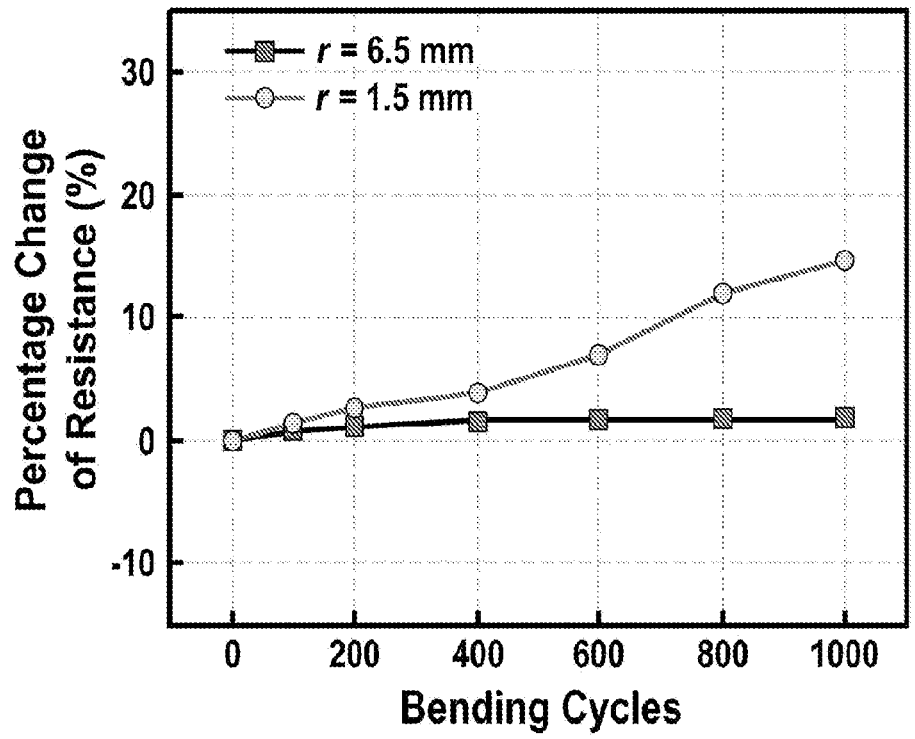
FIG. 22 includes a depiction of the change of electric resistance of MPGM after going through 1000 cycles at bending radius of 6.5 mm (square) and 1.5 mm (circle).
Figure 23:
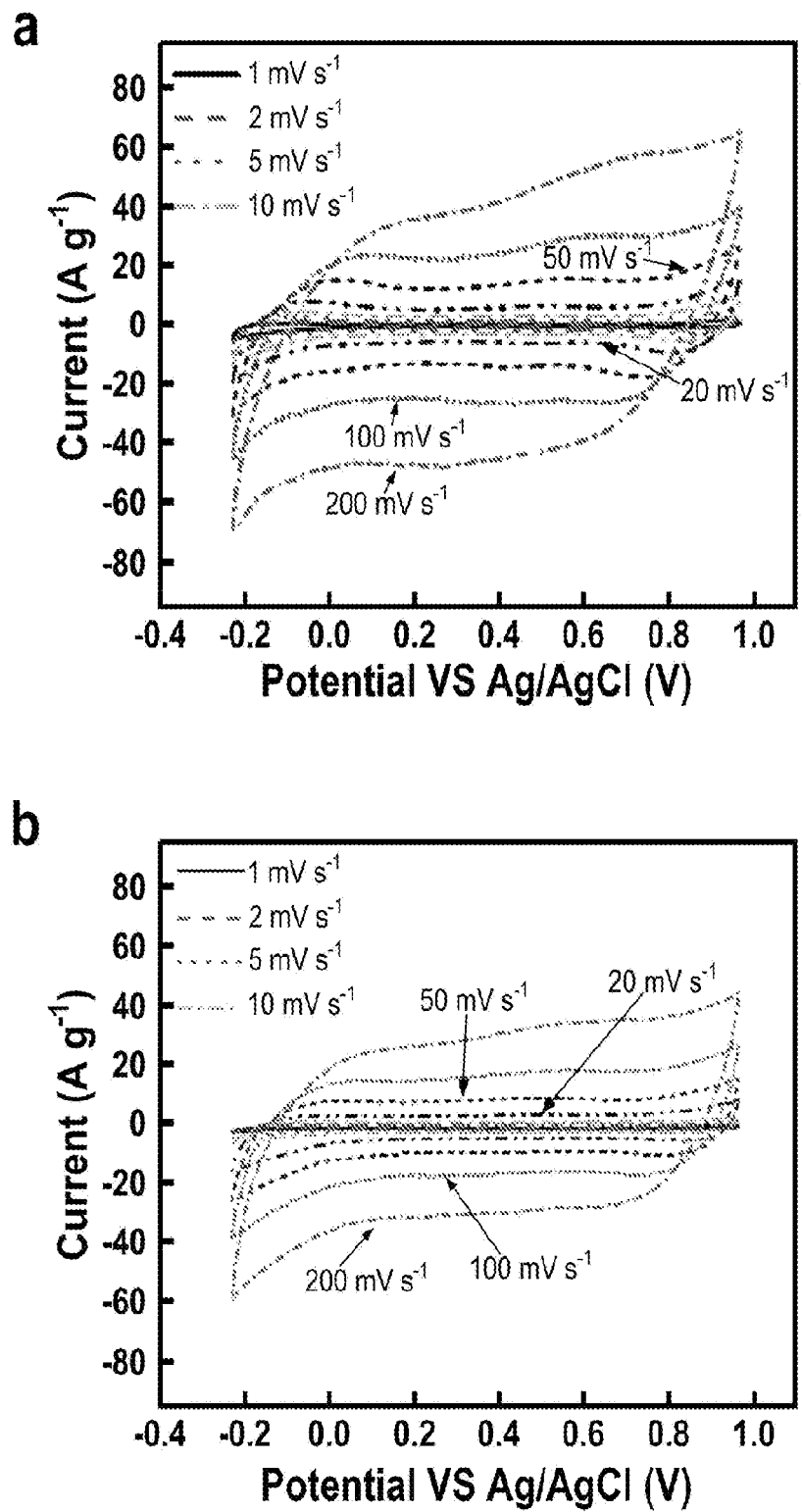
FIG. 23 includes a depiction of energy storage characterization in three-electrode setup: (a) CV curves of 5 hr-MPGM-20 w.r.t. net mass of $Mn_3O_4$ and 2.5 hr-MPGM-60 w.r.t total mass of MPGM composite.
Figure 24:
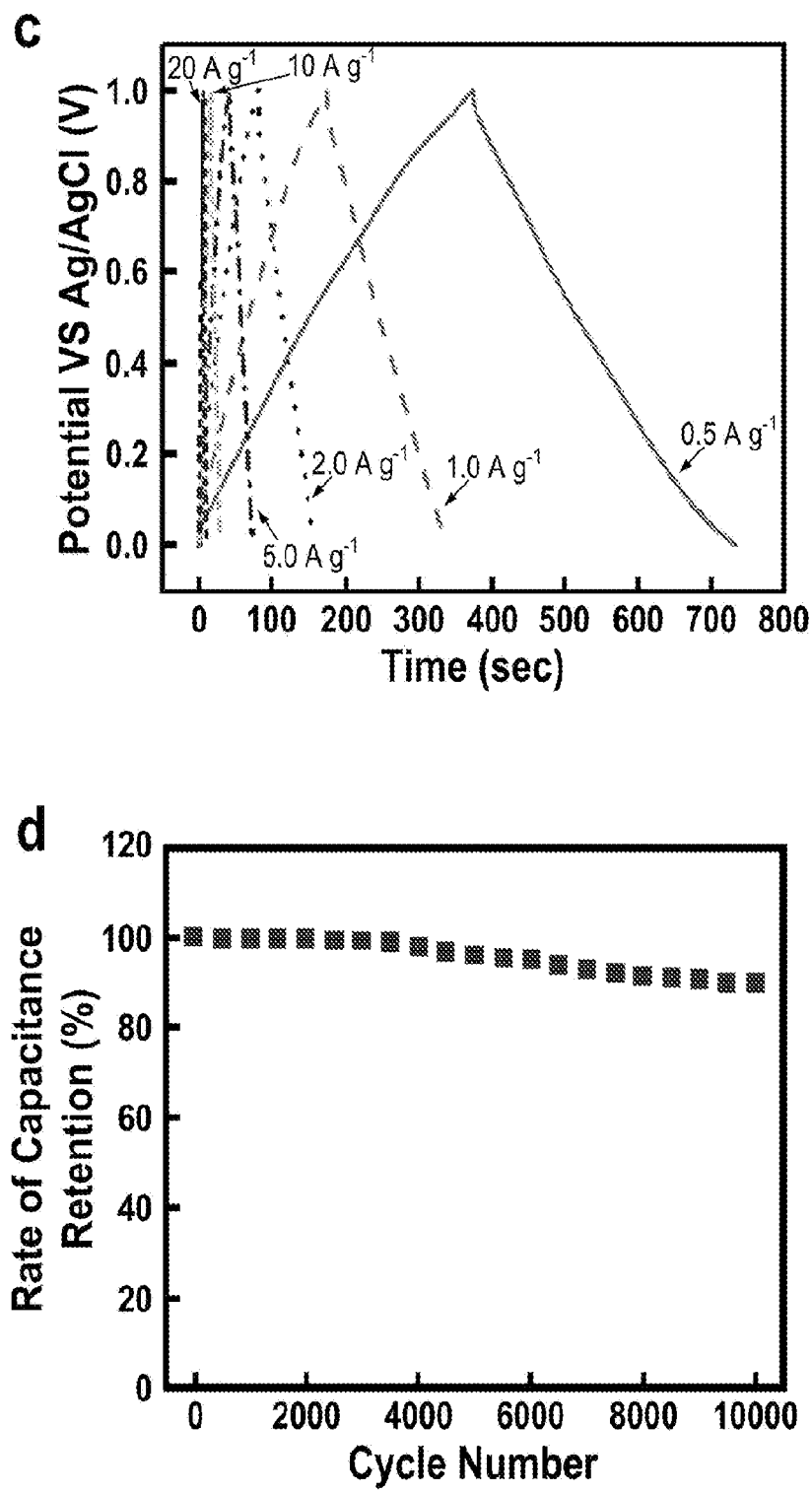
FIG. 24 includes a depiction of (c) galvanostatic charging/discharging curves of 2.5 hr-MPGM-60 w.r.t total mass of MPGM composite and (d) capacitance retention of MPGM-60 at 10 A g$^{-1}$ after 10,000 charging and discharging cycles.
Figure 25:
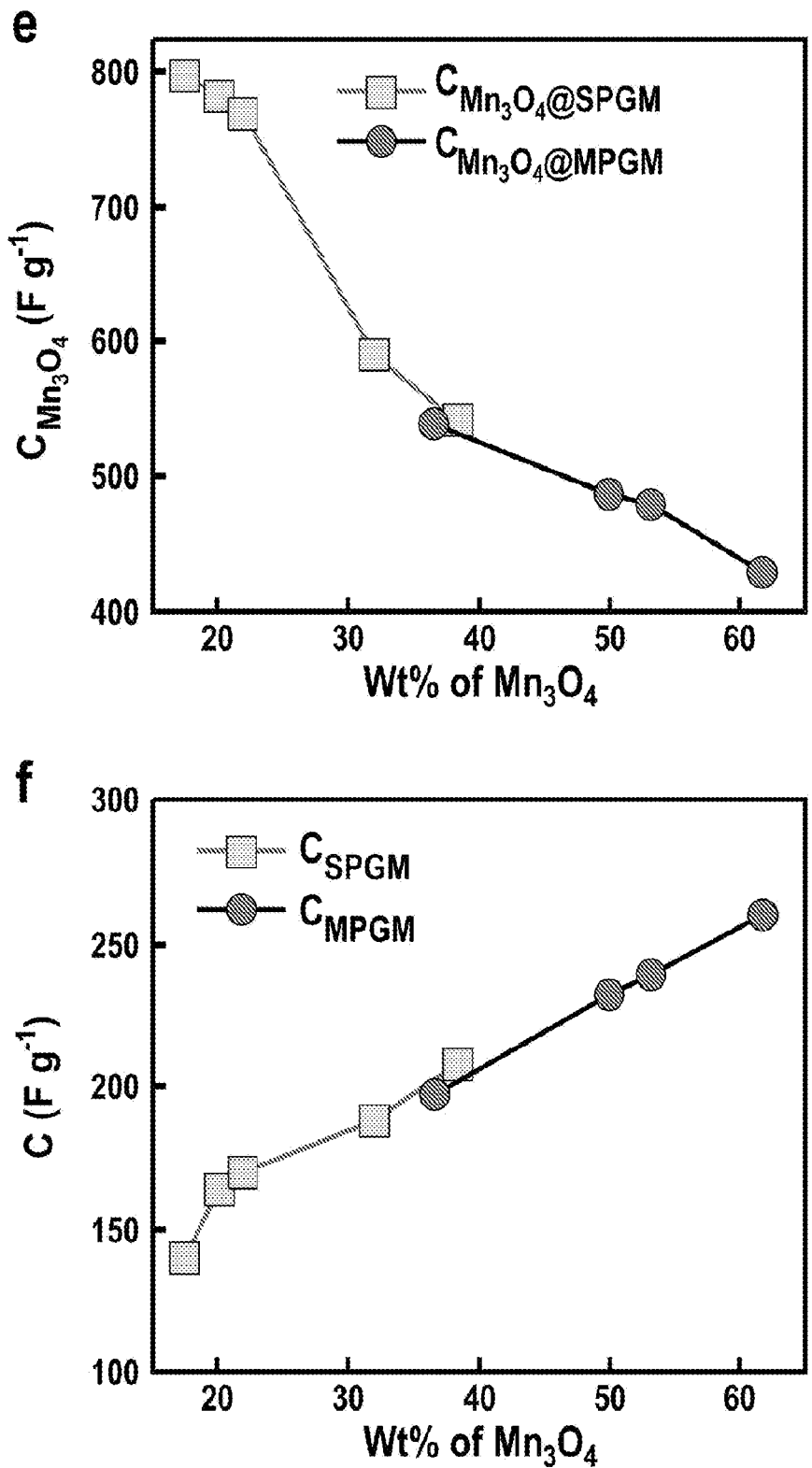
FIG. 25 includes a depiction of specific capacitance versus weight percentage of $Mn_3O_4$ at a scanning rate of 1 mV s$^{-1}$, determined based on (e) the pure mass of $Mn_3O_4$ and (f) the entire mass of the graphite/$Mn_3O_4$ electrodes.
Figure 26:
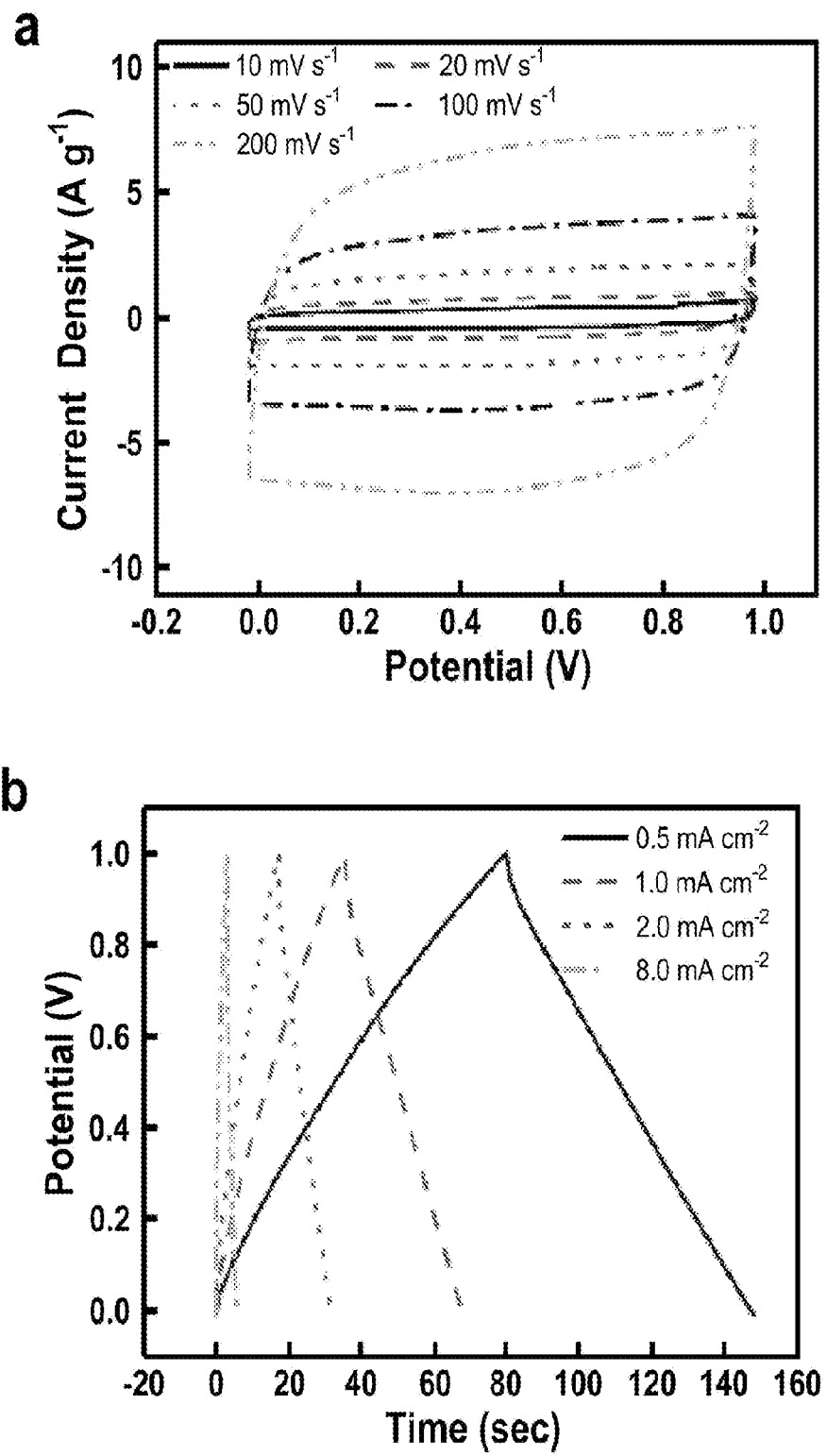
FIG. 26 includes a depiction of full cell tests of aqueous supercapacitors: (a) CV at 10 to 200 mV s$^{-1}$, (b) GCD at 0.5 to 8 mA cm$^{-2}$.
Figure 27:
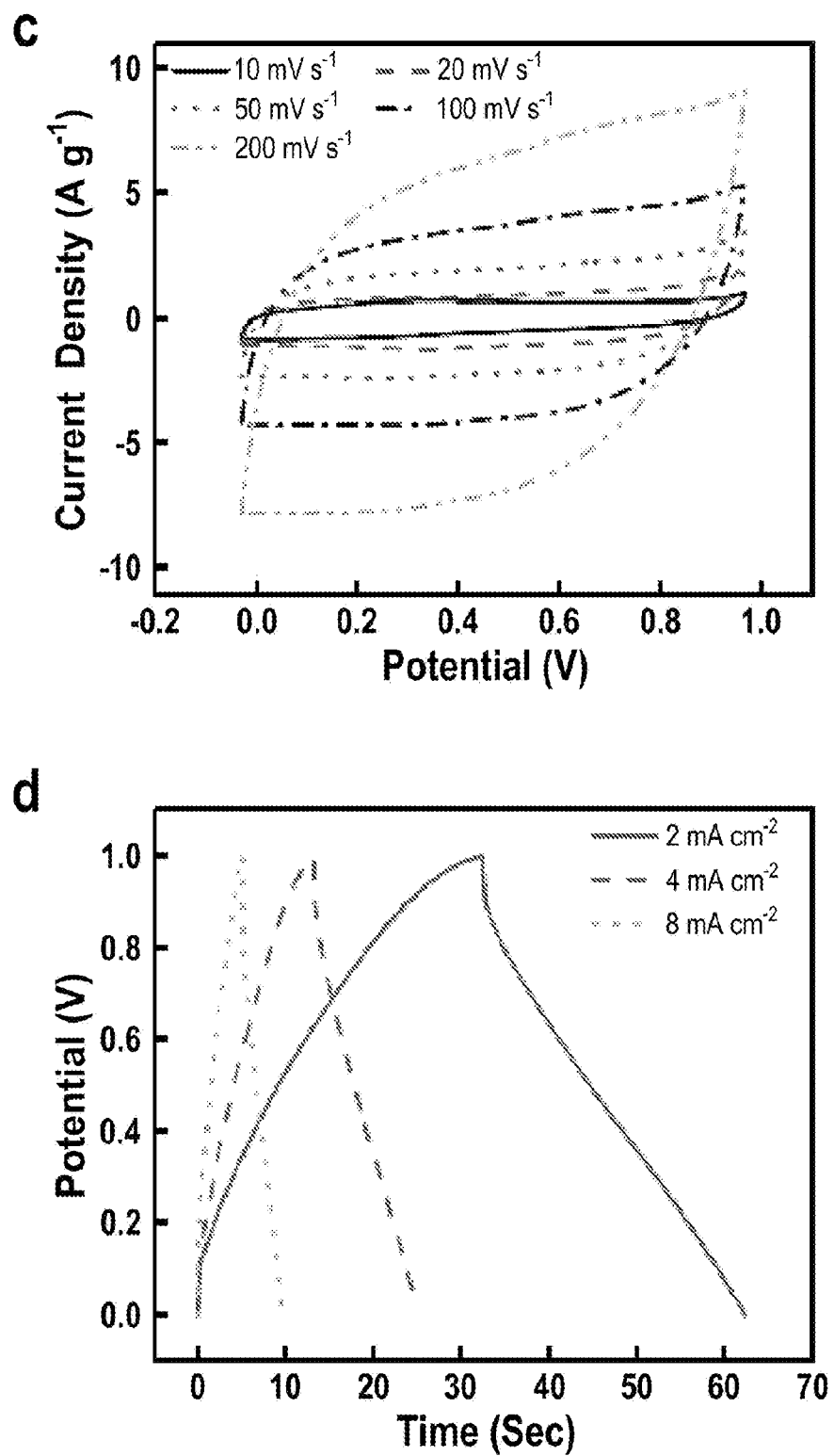
FIG. 27 includes a depiction of full cell tests of all-solid-state supercapacitors: (c) CV at 10 to 200 mV s$^{-1}$, (d) GCD at 2 to 8 mA cm$^{-2}$.
Figure 28:
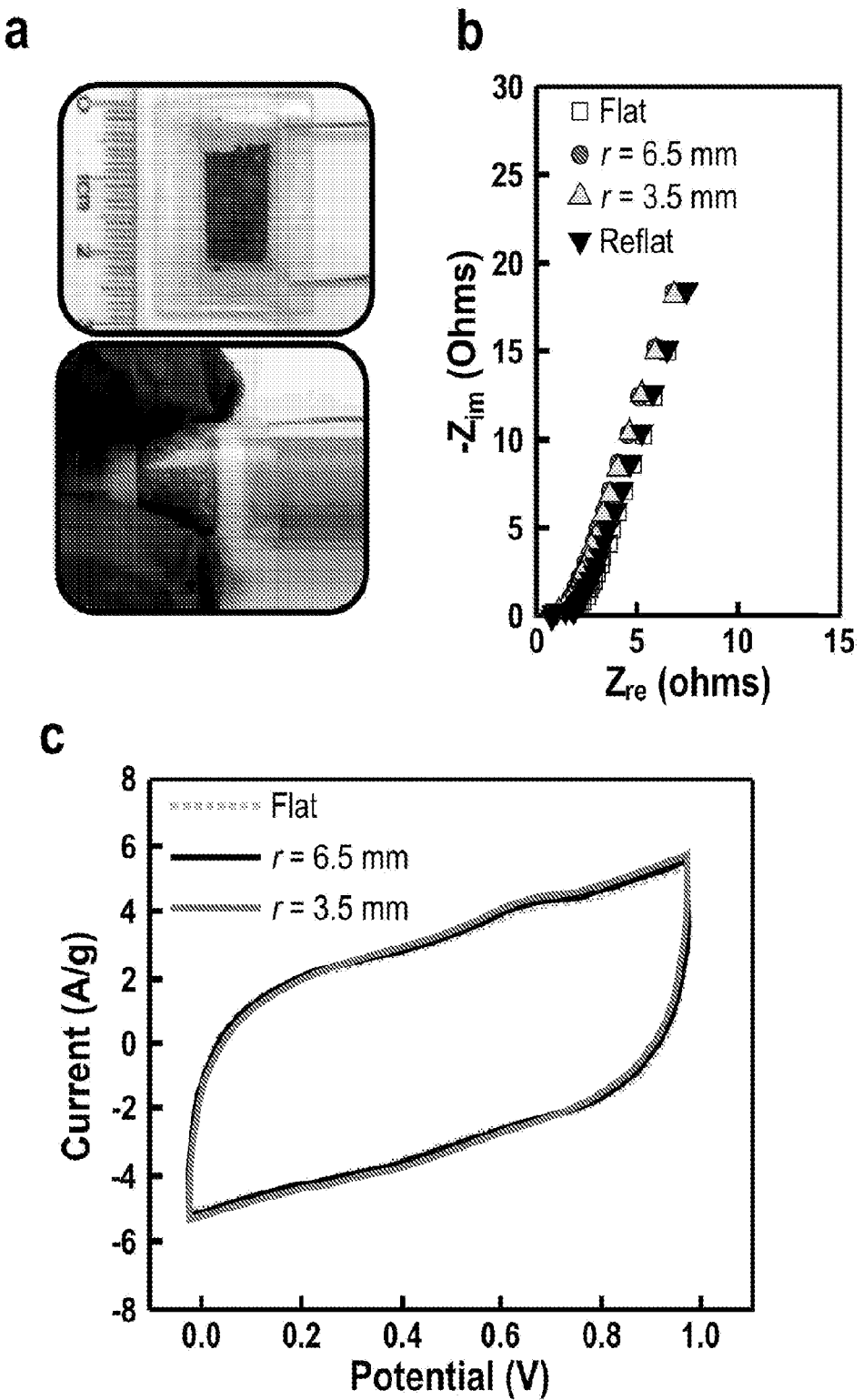
FIG. 28 includes a depiction of full cell tests of flexible all-solid-state supercapacitors. (a) Photographs showing a device in bending tests, when flat (top) and bended with controlled curvatures (bottom); (b-c) Electrochemical impedance spectra and CV curves (100 mV s$^{-1}$) at different bending states; (d) Specific capacitance retention rate of after cyclic bending at r=3.5 mm; (e) Ragone plots of our flexible supercapacitor device (orange asterisks: results based on pure active materials; green asterisks: results based on mass of entire electrode), compared with those of similar symmetrical systems, which are obtained based on pure active materials.
Figure 28:
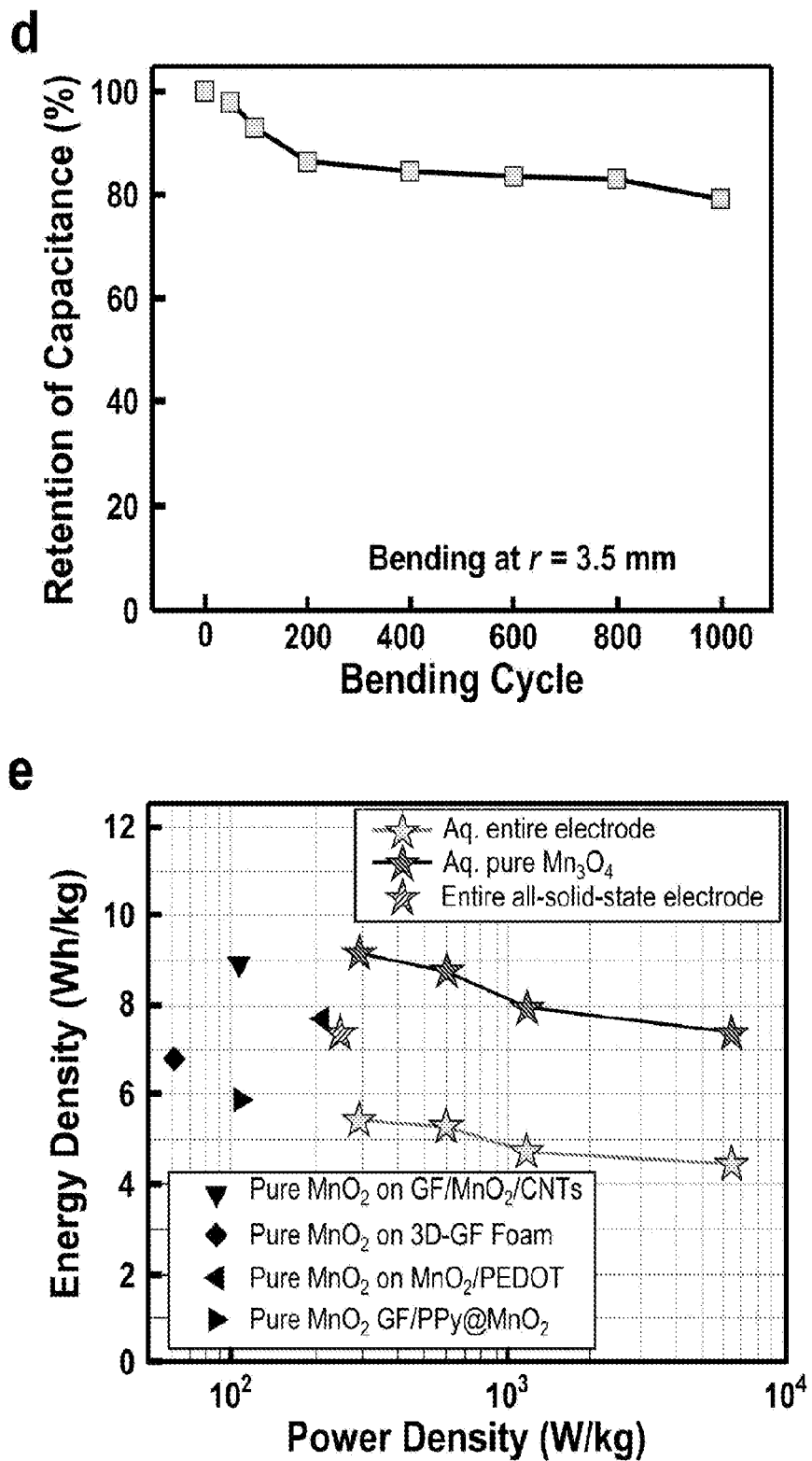

The assembly of symmetric supercapacitors is illustrated in FIG. 4. In detail, one 2.5 hr-MPGM-60 (1 cm by 2 cm in area) was attached on thin PDMS film with silver epoxy and a conductive wire, working as both electrode materials and current collectors. Then, a few drops of electrolyte, like sodium sulfate ($Na_2SO_4$, 1 M) or LiCl/PVA gel were infiltrated onto the MPGM/PDMS composite following by having the separator assembled on the top. After infiltrating a few more drops of electrolyte, we degassed the composite for 20 min. Finally, two pieces of MPGM/PDMS composites were sandwiched together to form the symmetric supercapacitors. The LiCl/PVA based all-solid-state supercapacitors were dried in an oven at 50° C. for overnight.

Example 8: Fabrication of Strain Sensors

The PDMS liquid was made from a viscous mixture of base and curing agent with a mass ratio of 10:1 followed by degassing in vacuum for 1 hr. Then the liquid mixture was spin-coated on a glass slide at 500 rpm s$^{-1}$ for 30 sec and then cured at 65☐ for 1 hr. The cured PDMS acted as the base for the TGF/PDMS composite. Next, two conductive copper wires were fixed on two ends of the PDMS base. An SPG foam (30 hr CVD for graphite growth) trimmed into a dimension of 2×1 cm$^2$ was assembled on these two wires. Next, a second layer of PDMS liquid was infiltrated into the TGF scaffold. In order to fill the PDMS completely, after infiltration, the PDMS liquid was degassed for 1 hr before spun at 200 rpm s$^{-1}$ for 30 sec and cured at 65☐ for 1 hr.

Example 9: Integration of Strain Sensors and Supercapacitors

Figure 29:
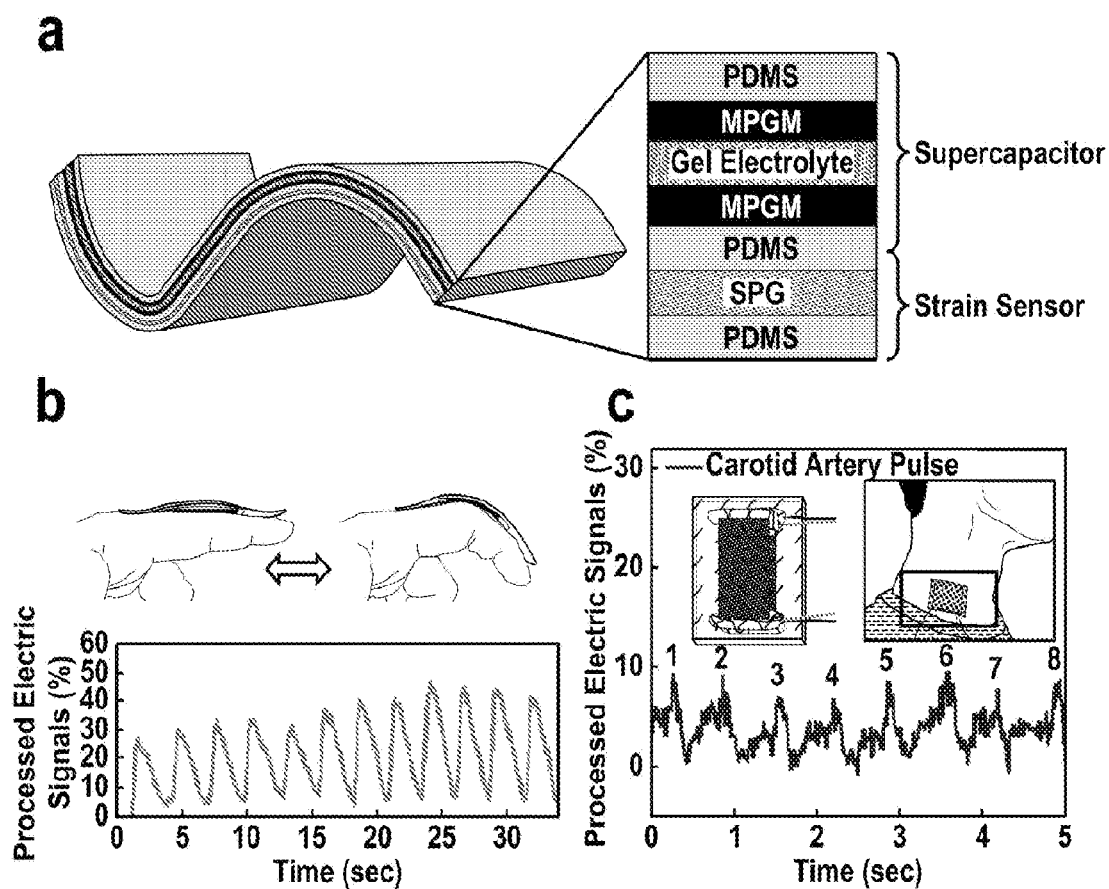
FIG. 29 includes a depiction of a schematic of a self-powered strain sensing device: flexible all-solid-state supercapacitor integrated with a strain sensor. (b) Detection of finger bending in real time, top inset: photographs of a finger in the test. (c) Detection of carotid artery pulses in real time; inset: photograph of the integrated device (left) and its application in pulse test (right).
Figure 30:
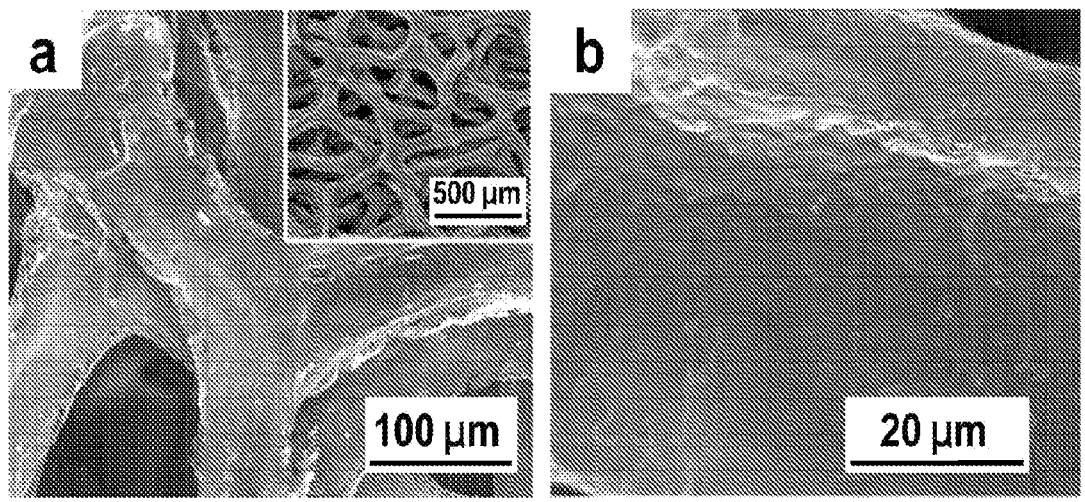
FIG. 30 includes a depiction of SEM images of single-level porous graphite foams (SPG).
Figure 31:
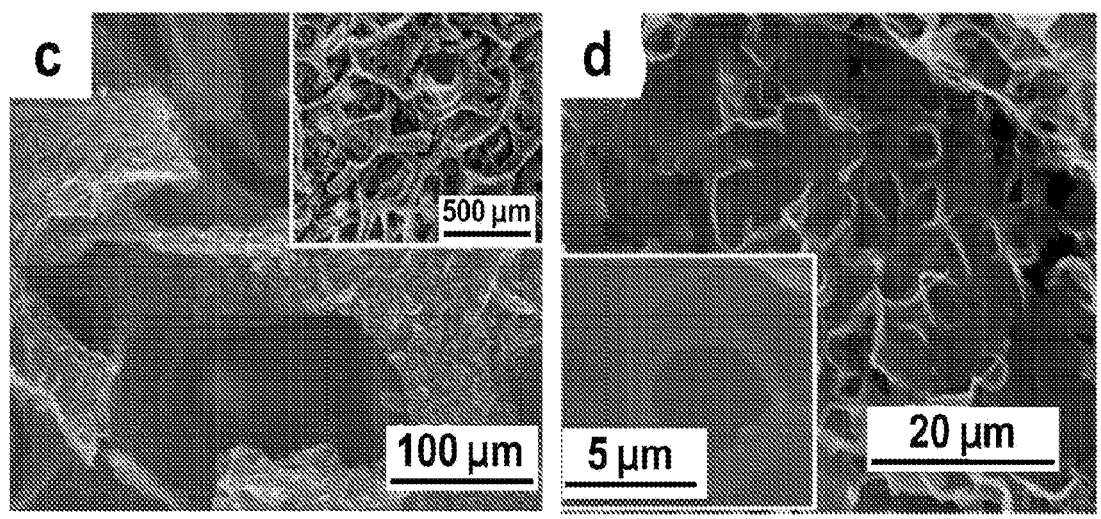
FIG. 31 includes a depiction of SEM images of 3-D ultrathin MPG made from Ni—Cu foams with ~4.6 μm pores.
Figure 32:
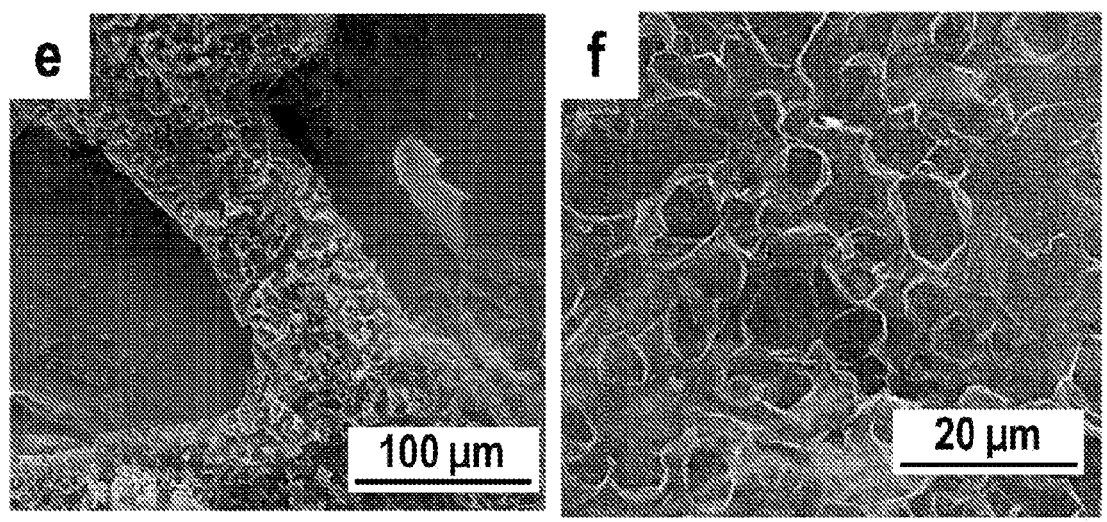
FIG. 32 includes a depiction of SEM images of 3-D ultrathin MPG made from Ni—Cu foams with ~8.3 μm pores.
Figure 33:
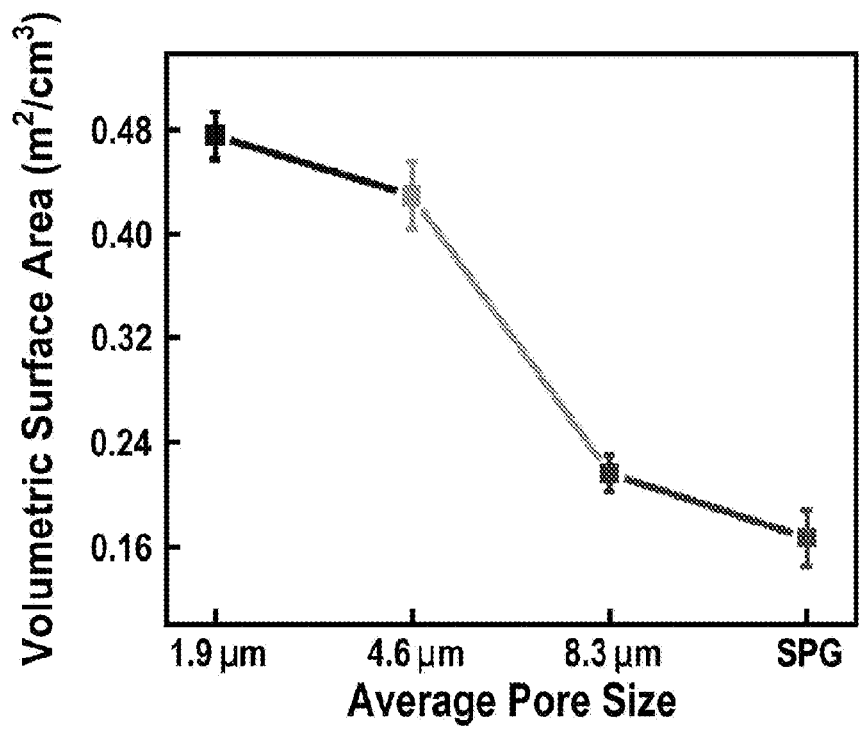
FIG. 33 includes a depiction of the volumetric surface areas of graphite with single-level porosity (SPG) and multilevel porous graphite (MPG) made from Ni—Cu foams of different pore size (1.9 μm, 4.6 μm and 8.3 μm).
Figure 34:
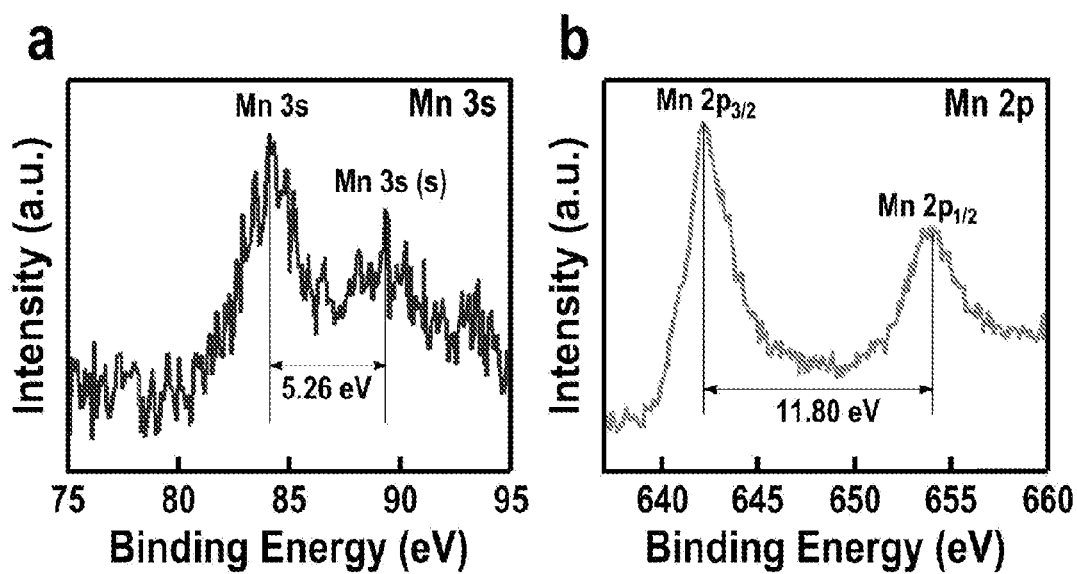
FIG. 34 includes a depiction of an XPS spectra of the (a) Mn 3s region, and (b) Mn 2p region of $Mn_3O_4$ synthesized on graphite foams.
Figure 35:
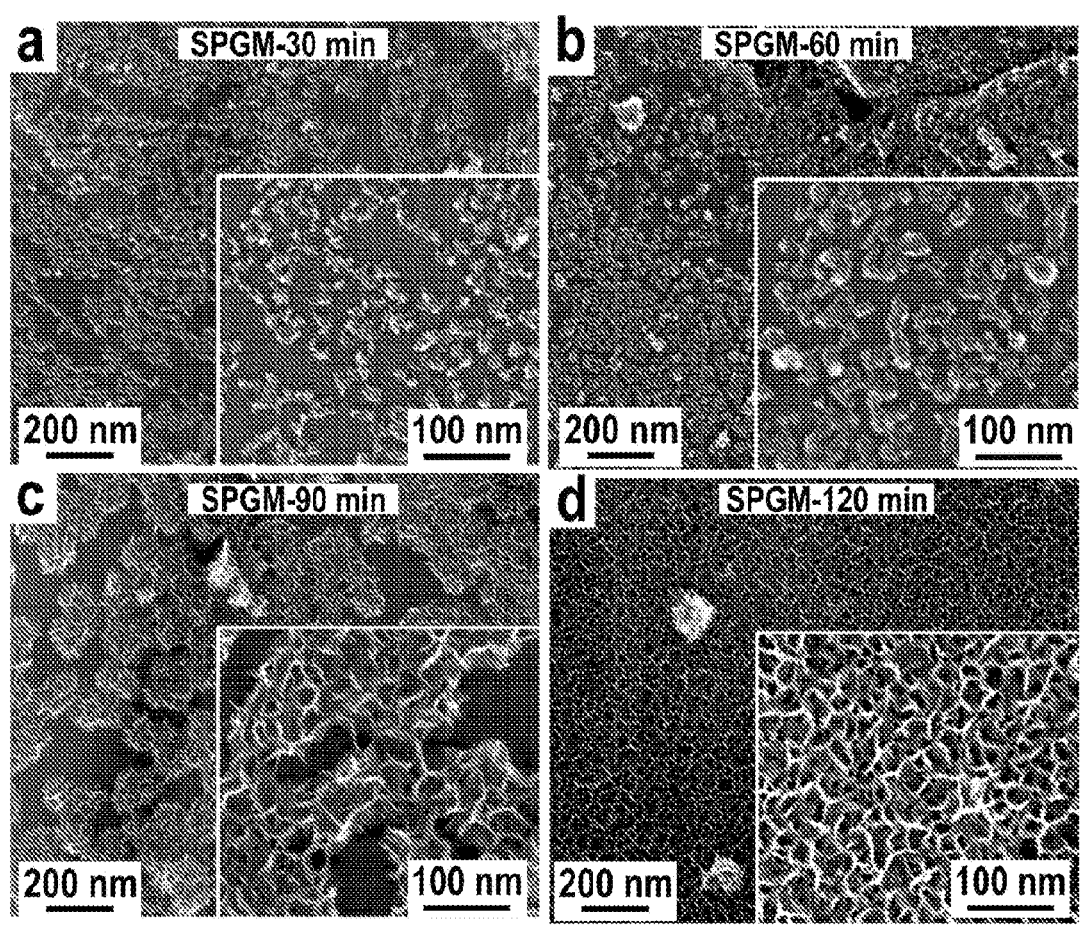
FIG. 35 includes a depiction of SEM characterization of $SPG/Mn_3O_4$ composites (SPGM) with different $Mn_3O_4$ coating time (a-d) 30 min, 60 min, 90 min and 120 min.
Figure 36:
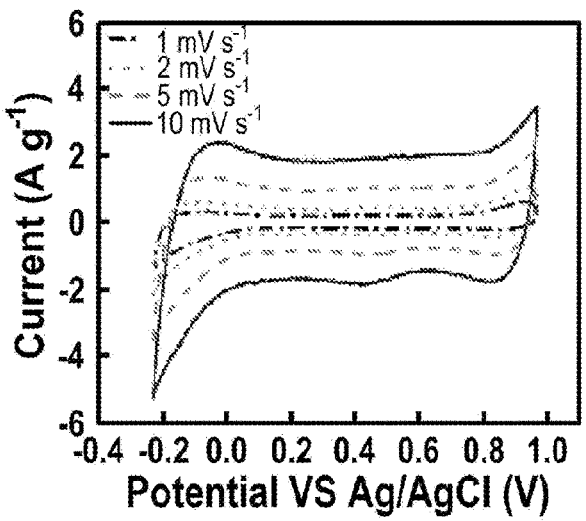
FIG. 36 includes a depiction of (a) CV curves of 2.5 hr-MPGM-60 w.r.t total mass of MPGM composite at scan rates from 1 to 10 mV s$^{-1}$. (b) GCD curves of 2.5 hr-MPGM-60 w.r.t total mass of MPGM composite within a potential window of −0.2 to 1.0 V. (c) Specific capacitance of 2.5 hr-MPGM-60 w.r.t. total mass at different discharging current density operated in the potential window of −0.2 to 1.0 V.
Figure 36:
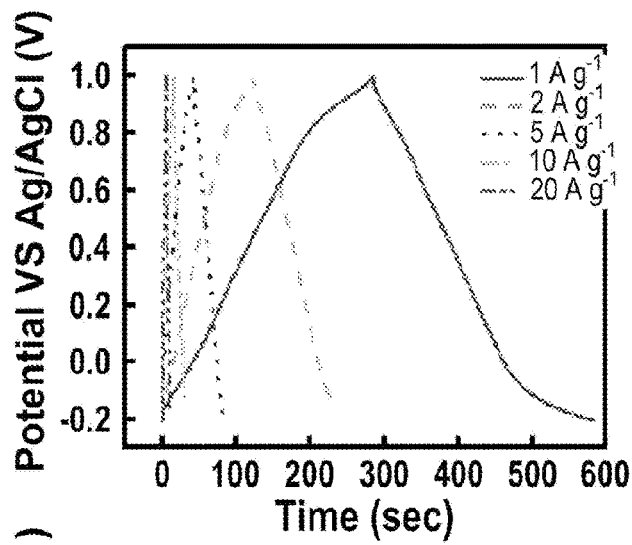
Figure 36:
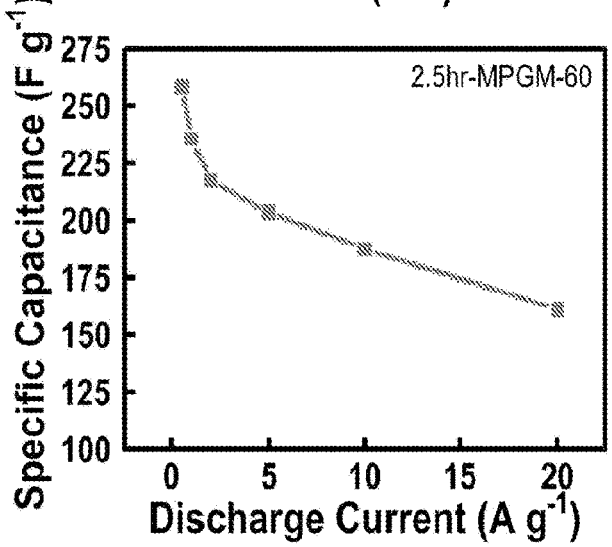
Figure 37:
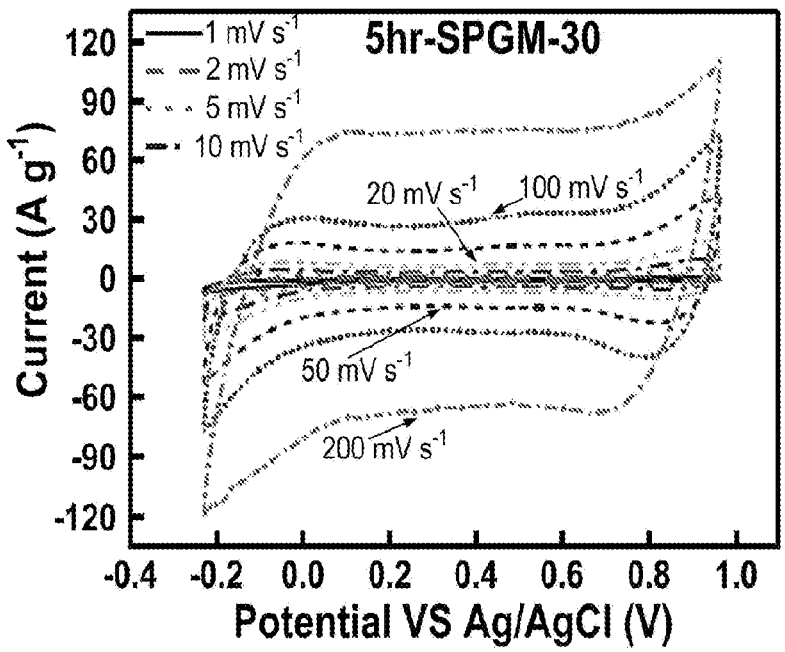
FIG. 37 includes a depiction of CV curves of 5 hr-SPGM-30 w.r.t net mass of $Mn_3O_4$ at scan rates from 1 to 200 mV s$^{-1}$.
Figure 38:
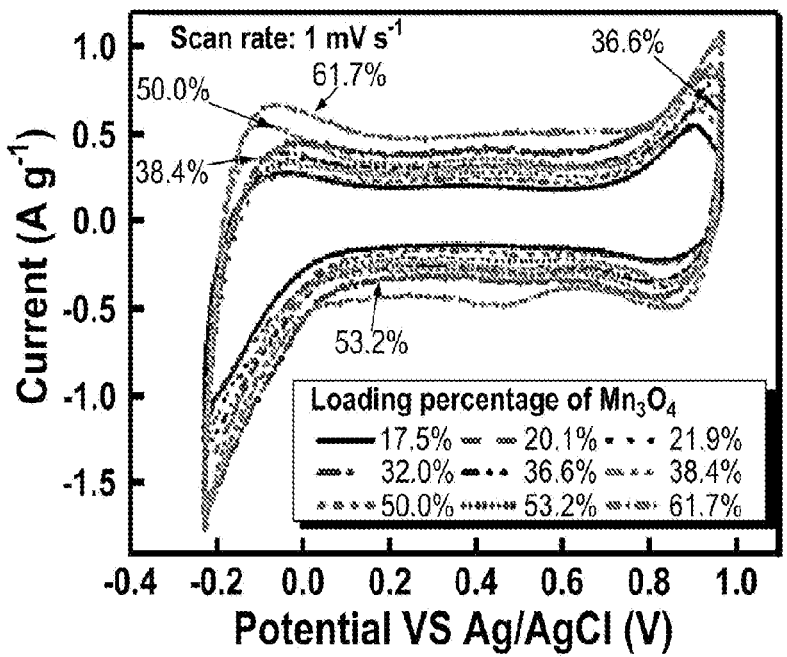
FIG. 38 includes a depiction of CV curves of graphite/$Mn_3O_4$ composite with different mass loading percentage of $Mn_3O_4$ at the scan rate of 1 mV s$^{-1}$.
Figure 39:
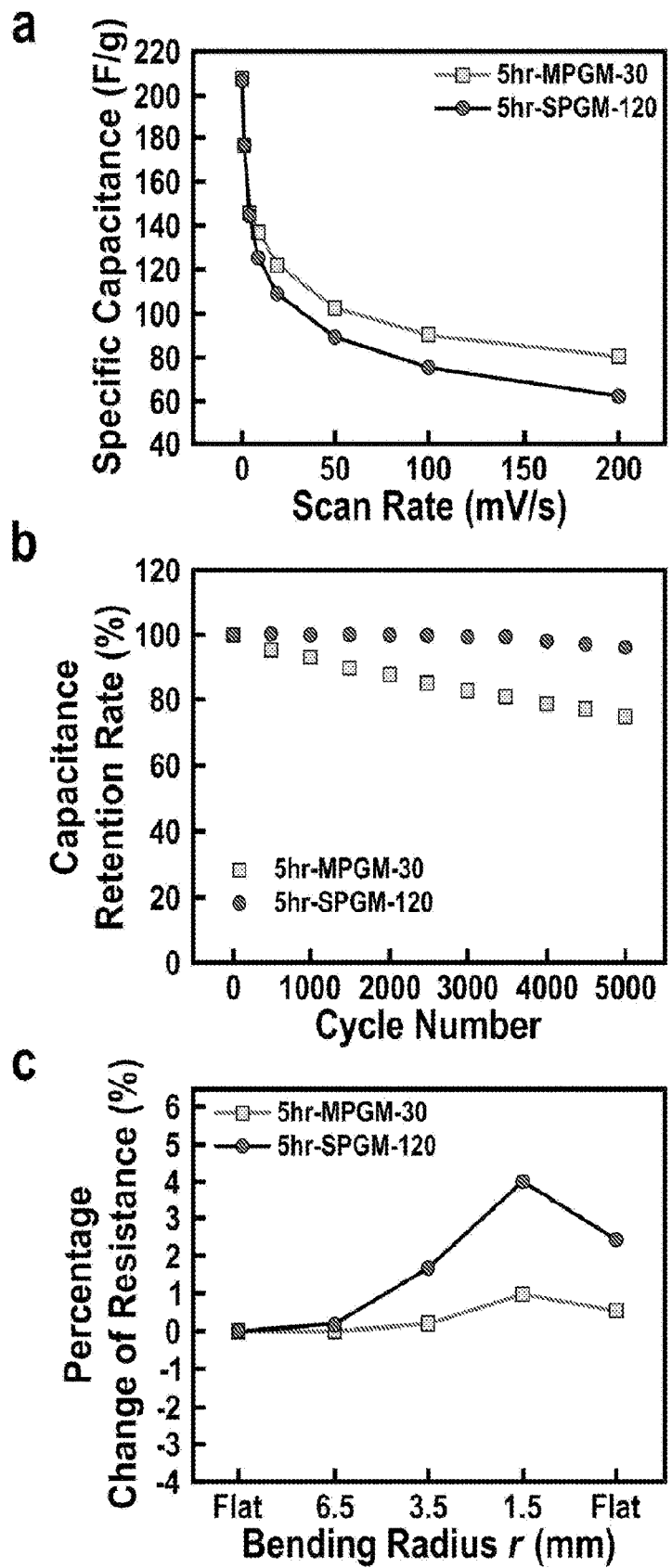
FIG. 39 includes a depiction of electrochemical and mechanical tests comparison between 5 hr-MPGM-30 and 5 hr-SPGM-120 that have the same mass loading of active materials/sample area (~0.21 mg cm$^{-2}$). (a) Specific capacitance vs scan rate; (b) capacitance retention at 10 A g$^{-1}$; (c) change of electric resistance at different bending radii.
Figure 40:
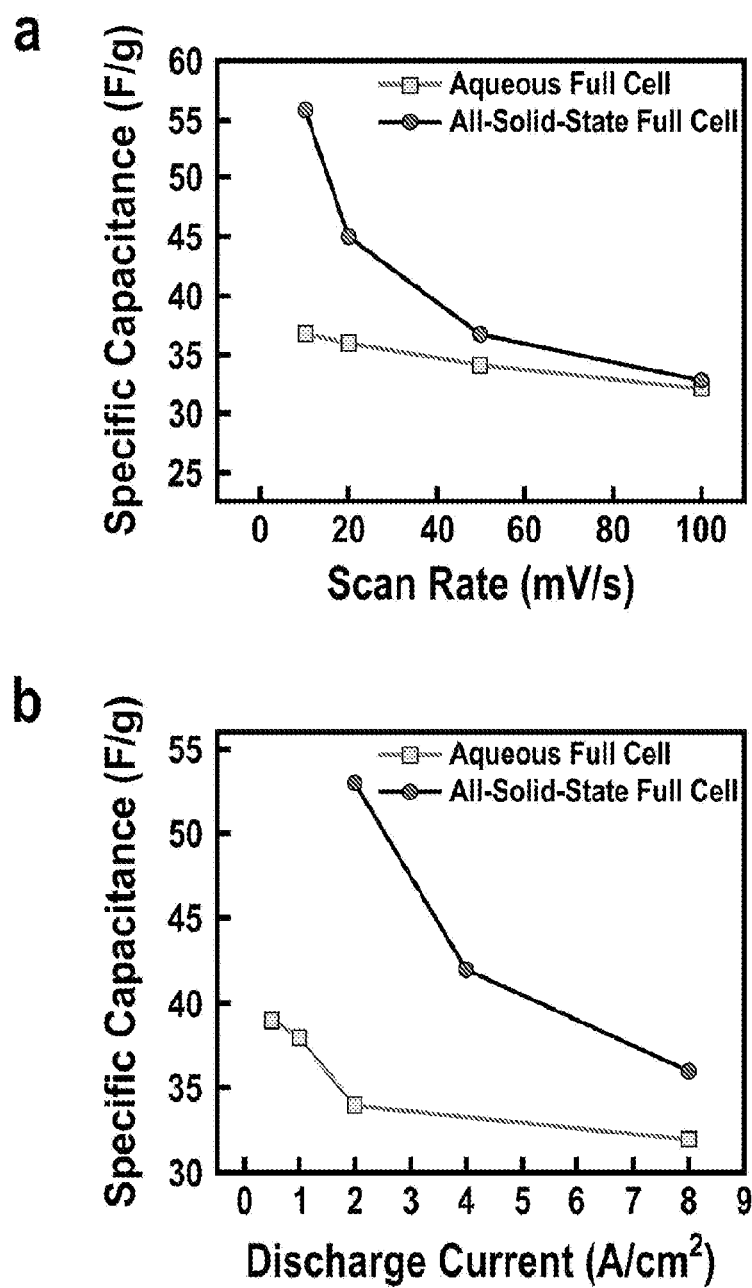
FIG. 40 includes a depiction of the specific capacitance of full cells vs (a) scan rate and (b) discharge current density FIG. 41 includes a depiction of the change of electric resistance versus bending radii of SPG) and MPG of a similar areal mass density (~2.3 mg/cm$^2$).
Figure 41:
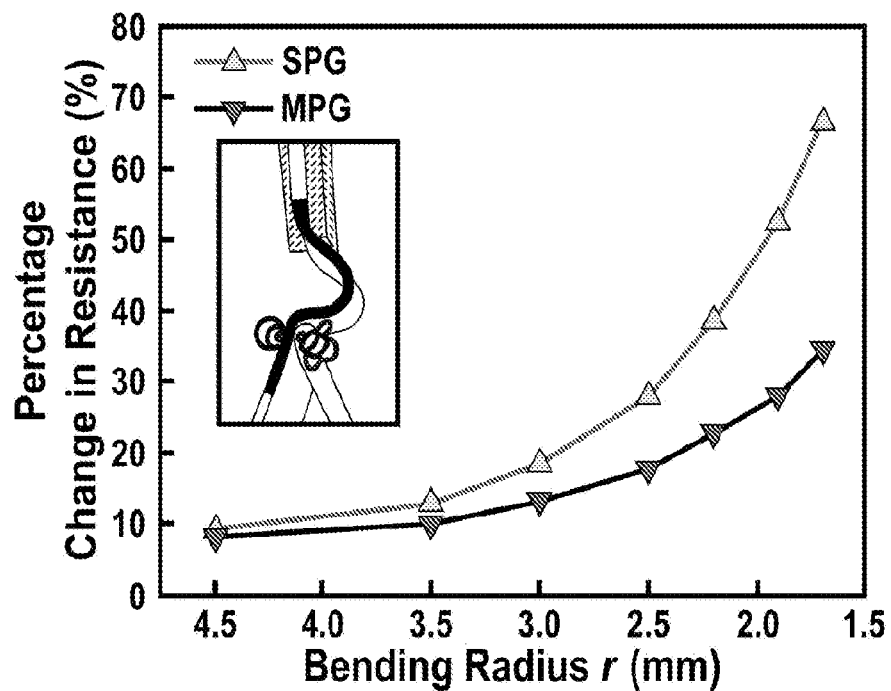
Figure 42:
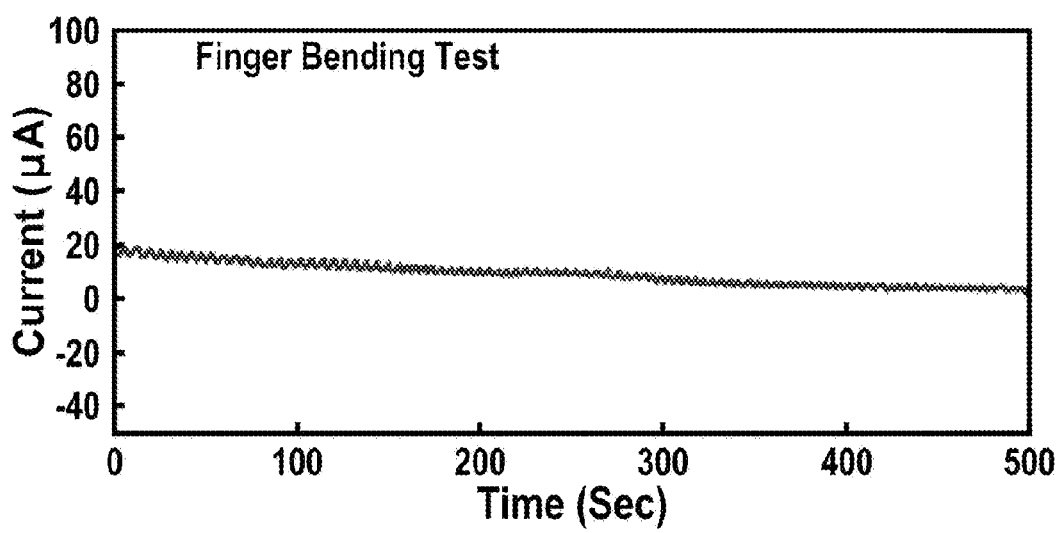
FIG. 42 includes a depiction of the electric current obtained from finger bending. The oscillation of current synchronizes with the folding an unfolding of the finger.

In order to seamlessly integrate strain sensors with supercapacitors, the top PDMS layer of the strain sensor is employed as a flexible substrate for laying an electrode composite (MPGM) of the supercapacitor as shown in FIG. 29a. By using the method in Example 7, the strain sensor and supercapacitor can be integrated into a single device.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A flexible supercapacitor comprising:
    a. a multilevel porous graphite foam, wherein the multilevel porous graphite foam comprises a porous graphite core and a first porous graphite shell, wherein the porosity of the core and first shell are different; and
    b. at least one pseudocapacitive material.

2. The flexible supercapacitor according to claim 1, wherein the first porous graphite shell has a porosity that is less than 10% the porosity of the graphite core.

3. The flexible supercapacitor of according to claim 1, wherein the porous graphite core has a porosity from 100-200 μm.

4. The flexible supercapacitor according to claim 1, wherein the first porous graphite shell has a porosity from 0.5-10 μm.

5. The flexible supercapacitor according to claim 1, wherein the pseudocapacitive material comprises one or more transition metal oxides or transition metal hydroxides.

6. The flexible supercapacitor according to claim 1, wherein the pseudocapacitive material comprises one or more manganese oxides, manganese hydroxides, ruthenium oxides, ruthenium hydroxides, iridium oxides, iridium hydroxides, iron oxides, iron hydroxides, cobalt oxides, cobalt hydroxides, nickel oxides, nickel hydroxides, rhodium oxides, rhodium hydroxides, platinum oxides, platinum hydroxides, palladium oxides, or palladium hydroxides.

7. The flexible supercapacitor according to claim 1, wherein the pseudocapacitive material comprises one or more spinel metal oxides of the formula $AB_2O_4$, wherein A and B are the same or different transition metal.

8. The flexible supercapacitor according to claim 1, wherein the pseudocapacitive material comprises $Mn_3O_4$, $Fe_3O_4$, $Co_3O_4$, $MnFe_2O_4$, $NiCo_2O_4$, or $MnCo_2O_4$.

9. The flexible supercapacitor according to claim 1, wherein the pseudocapacitive material is coated on the surface of the multilevel porous graphite foam.

10. The flexible supercapacitor according to claim 1, wherein the pseudocapacitive material is present with a loading density from 0.1-0.50 mg/cm$^2$.

11. The flexible supercapacitor according to claim 1, wherein the pseudocapacitive material is coated on the surface of the multilevel porous graphite foam in the form of nanoparticles.

12. The flexible supercapacitor according to claim 11, wherein the pseudocapacitive nanoparticles have an average particle size from 1-100 nm.

13. The flexible supercapacitor according to claim 1, wherein the pseudocapacitive material is coated on the surface on the multilevel porous graphite foam in the form of a sheet having a thickness from 1-100 nm.

14. The flexible supercapacitor according to claim 1, wherein the multilevel porous graphite foam has a BET surface area of at least 7.5 m$^2$/g.

15. The flexible supercapacitor according to claim 1 prepared by a processing comprising:
    a) plating a first metal layer on a metal foam, wherein the metal in the first layer and metal in the foam are different;
    b) annealing the plated foam to give a porous substrate having a smooth surface covering porous microstructures;
    c) partially etching the porous substrate to give a multilevel porous substrate;
    d) depositing a carbonaceous layer on the multilevel porous substrate;
    e) completely etching the multilevel porous substrate to give a multilevel graphite foam; and
    f) depositing a pseudocapacitive material upon the multilevel graphite foam.

16. A stretchable strain sensor comprising the flexible supercapacitor of claim 1, and a graphite network embedded in an elastomer.

17. The sensor according to claim 16, wherein the graphite network is at least 10 carbon sheets thick.

18. A full cell comprising:
    a: a first supercapacitor according to claim 1;
    b: an electrolyte;
    c: a separator; and
    d: a second supercapacitor according to claim 1.

19. The full cell according to claim 18, further comprising an elastomeric polymer.

* * * * *